US010585701B2

(12) United States Patent
Kloosterman et al.

(10) Patent No.: US 10,585,701 B2
(45) Date of Patent: Mar. 10, 2020

(54) DYNAMICALLY ALLOCATING STORAGE ELEMENTS TO PROVIDE REGISTERS FOR PROCESSING THREAD GROUPS

(71) Applicant: The Regents of The University of Michigan, Ann Arbor, MI (US)

(72) Inventors: John Kloosterman, Ann Arbor, MI (US); Jonathan Beaumont, Ann Arbor, MI (US); Davoud Anoushe Jamshidi, Ann Arbor, MI (US); Jonathan Bailey, Ann Arbor, MI (US); Trevor Mudge, Ann Arbor, MI (US); Scott Mahlke, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 155 days.

(21) Appl. No.: 15/782,098

(22) Filed: Oct. 12, 2017

(65) Prior Publication Data
US 2019/0114205 A1 Apr. 18, 2019

(51) Int. Cl.
*G06F 9/48* (2006.01)
*G06F 9/50* (2006.01)
*G06F 9/46* (2006.01)

(52) U.S. Cl.
CPC ............ *G06F 9/4881* (2013.01); *G06F 9/462* (2013.01); *G06F 9/5016* (2013.01)

(58) Field of Classification Search
CPC ...... G06F 9/4881; G06F 9/5016; G06F 9/462; G06F 9/383; G06F 9/3836; G06F 9/3851; G06F 9/46; G06F 9/48; G06F 8/441
USPC ......... 712/216, 220; 717/151, 152; 718/102, 718/104
See application file for complete search history.

(56) References Cited

U.S. PATENT DOCUMENTS

| 4,435,753 A | * | 3/1984 | Rizzi | ...................... G06F 8/441 717/153 |
| 2009/0089548 A1 | * | 4/2009 | Sung | ................... G06F 9/30047 712/207 |
| 2011/0161616 A1 | * | 6/2011 | Tarjan | ..................... G06F 9/384 711/170 |

OTHER PUBLICATIONS

M. Gebhart et al., "A Compile-Time Managed Multi-Level Register File Hierarchy", Micro '11, Dec. 3-7, 2011, pp. 465-476.
(Continued)

*Primary Examiner* — Aimee Li
*Assistant Examiner* — Shawn Doman
(74) *Attorney, Agent, or Firm* — Nixon & Vanderhye P.C.

(57) ABSTRACT

A technique is provided for processing thread groups, each thread group having associated program code comprising a plurality of regions that each require access to an associated plurality of registers providing operand values for the instructions of that region. Capacity management circuitry is arranged, for a thread group having a region of the associated program code that is ready to be executed, to perform an operand setup process to reserve sufficient storage elements within an operand staging unit to provide the associated plurality of registers, and to cause the operand value for any input register to be preloaded into a reserved storage element allocated for that input register, an input register being a register whose operand value is required before the region can be executed. Scheduling circuitry selects for processing a thread group for which the operand setup process has been performed in respect of the region to be executed.

21 Claims, 13 Drawing Sheets

(56) References Cited

OTHER PUBLICATIONS

M. Gebhart et al., "Energy-efficient Mechanisms for Managing Thread Context in Throughput Processors", ISCA'11, Jun. 4-8, 2011, pp. 1-12.
H. Jeon et al., "GPU Register File Virtualization", Micro-48, Dec. 5-9, 2015, pp. 420-432.
D. Oehmke et al., "How to Fake 1000 Registers", IEEE Computer Society—MICRO'05, 2005, 12 pages.

* cited by examiner

DYNAMICALLY ALLOCATING STORAGE ELEMENTS TO PROVIDE REGISTERS FOR PROCESSING THREAD GROUPS

BACKGROUND

The present technique relates to an apparatus and method for processing thread groups.

In highly multithreaded architectures, such as often adopted by graphics processing units (GPUs), it is known to arrange the threads into thread groups. Whilst each thread group may contain one or more threads, in systems such as GPUs it is often the case that each thread group comprises a plurality of threads that are arranged to execute associated program code, such thread groups often being referred to as warps. An apparatus arranged in such a way can often achieve high computational throughput, since many threads can issue each cycle, and stalls in one thread can be hidden by switching to processing another thread. However, to achieve such high computational throughput, it is necessary for the apparatus to store the context for every active thread in a way that makes it available when required.

Registers make up a very significant proportion of each thread's state, and as a result such an apparatus has typically had to have a very large register file in order to ensure that the registers required by every active thread can be accessed as needed. However, the requirement for a large register file has area and energy consumption impacts, and accordingly it would be desirable to reduce the area and energy consumption requirements when providing the required registers, whilst avoiding an adverse impact on performance.

SUMMARY

In a first example configuration, there is provided an apparatus comprising: scheduling circuitry to select thread groups from a plurality of thread groups, each thread group having associated program code and comprising one or more threads; thread processing circuitry, responsive to the scheduling circuitry, to process one or more threads of a selected thread group by executing instructions of the associated program code for those one or more threads; the associated program code comprising a plurality of regions that each require access to an associated plurality of registers providing operand values for the instructions of that region; an operand staging unit comprising a plurality of storage elements that are dynamically allocated to provide the associated plurality of registers for one or more of the regions; and capacity management circuitry arranged, for a thread group having a region of the associated program code that is ready to be executed, to perform an operand setup process to reserve sufficient storage elements within the operand staging unit to provide the associated plurality of registers required to be accessed by the region, and to cause the operand value for any input register within the associated plurality of registers to be preloaded into a reserved storage element allocated for that input register, where an input register is a register whose operand value is required before the region can be executed; the scheduling circuitry being arranged to select a thread group for which the capacity management circuitry has performed the operand setup process in respect of the region to be executed, and the thread processing circuitry being arranged to execute the instructions of the region of the selected thread group with reference to the registers as provided by the operand staging unit.

In another example configuration, there is provided a method of processing thread groups within an apparatus having scheduling circuitry to select thread groups from a plurality of thread groups, each thread group having associated program code and comprising one or more threads, and thread processing circuitry, responsive to the scheduling circuitry, to process one or more threads of a selected thread group by executing instructions of the associated program code for those one or more threads, the method comprising: identifying within the associated program code a plurality of regions that each require access to an associated plurality of registers providing operand values for the instructions of that region; providing an operand staging unit comprising a plurality of storage elements that are dynamically allocated to provide the associated plurality of registers for one or more of the regions; and performing, for a thread group having a region of the associated program code that is ready to be executed, an operand setup process to reserve sufficient storage elements within the operand staging unit to provide the associated plurality of registers required to be accessed by the region, and to cause the operand value for any input register within the associated plurality of registers to be preloaded into a reserved storage element allocated for that input register, where an input register is a register whose operand value is required before the region can be executed; causing the scheduling circuitry to select a thread group for which the operand setup process has been performed in respect of the region to be executed; and causing the thread processing circuitry to execute the instructions of the region of the selected thread group with reference to the registers as provided by the operand staging unit.

In a yet further example configuration, there is provided a non-transitory computer program product comprising a compiler program used to compile program code for execution on an apparatus in accordance with the above-mentioned first example configuration, said compiler program when executed on a computer to compile said program code, being arranged to divide said program code into a plurality of regions, and to annotate the program code so as to provide, for each region that requires access to an associated plurality of registers, region information providing an indication of the number of storage elements that need to be reserved in order to provide the associated plurality of registers, and identifying the registers that are input registers.

BRIEF DESCRIPTION OF THE DRAWINGS

The present technique will be described further, by way of illustration only, with reference to examples thereof as illustrated in the accompanying drawings, in which.

DESCRIPTION OF EXAMPLES

Figure 1:
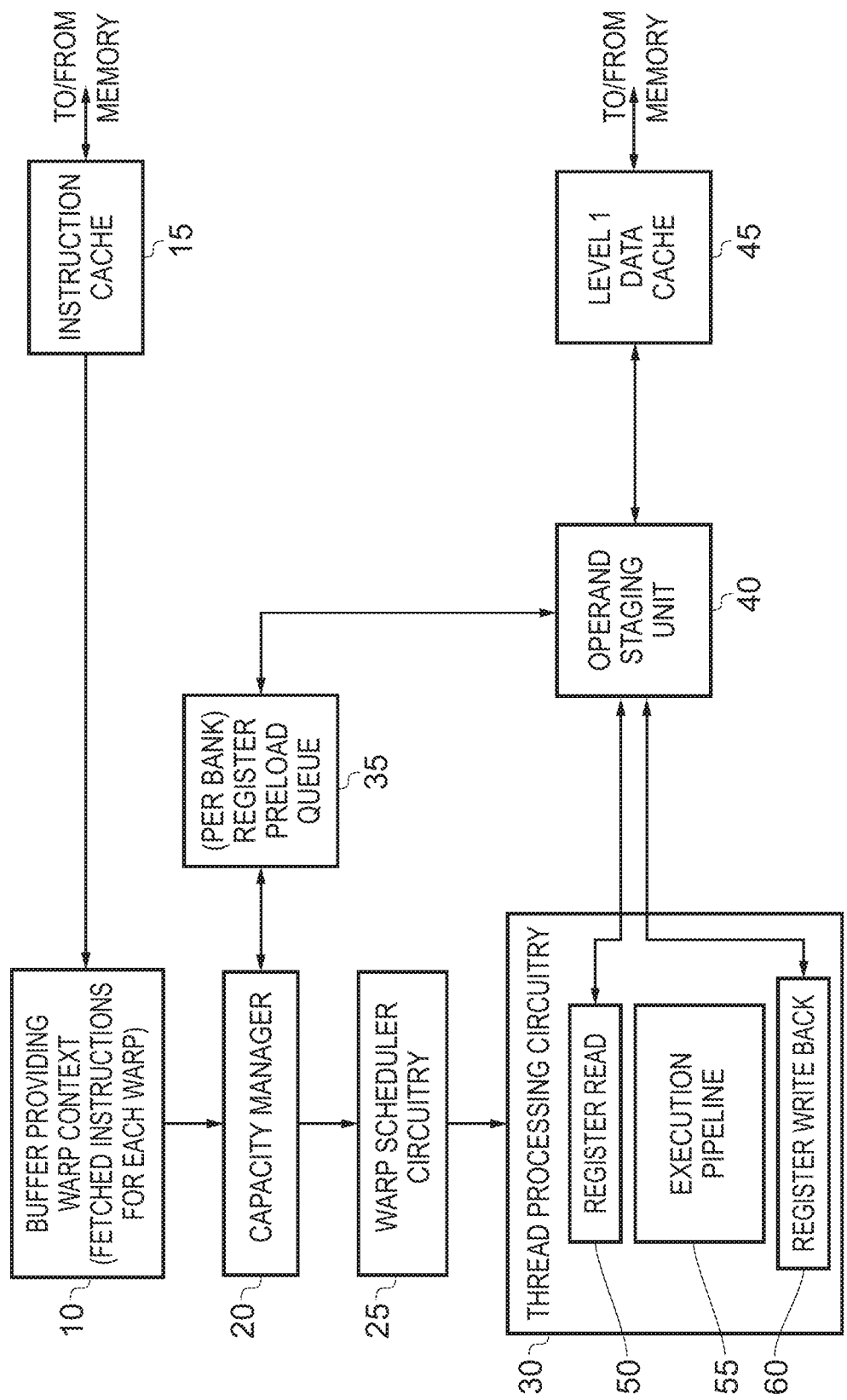
FIG. 1 is a block diagram illustrating components provided within an apparatus in one example arrangement.

In one example arrangement, an apparatus is provided that comprises scheduling circuitry used to select thread groups from a plurality of thread groups, where each thread group has associated program code and comprises one or more threads. The apparatus further has thread processing circuitry which is responsive to the scheduling circuitry to process one or more threads of each selected thread group chosen by the scheduling circuitry. For each selected thread group, the thread processing circuitry is arranged to process one or more threads of that thread group by executing instructions of the associated program code for those one or more threads.

The associated program code has a plurality of regions that each require access to an associated plurality of registers providing operand values for the instructions of that region. Typically, for any particular region, the associated plurality of registers will be a subset of the total registers that may be specified by instructions of the associated program code. The apparatus then provides an operand staging unit that comprises a plurality of storage elements that are dynamically allocated to provide the associated plurality of registers for one or more of the regions. In some instances, the program code may also contain one or more regions that do not require access to registers.

The use of the operand staging unit is controlled by capacity management circuitry which is arranged, for a thread group that has a region of the associated program code that is ready to be executed, to perform an operand setup process to reserve sufficient storage elements within the operand staging unit to provide the associated plurality of registers required to be accessed by the region. Further, during the operand setup process, the capacity management circuitry is arranged to cause the operand value for any input register within the associated plurality of registers to be preloaded into a reserved storage element allocated for that input register. As used herein, an input register is a register whose operand value is required before the region can be executed. By preloading the operand values for such input registers, this ensures that by the time the thread group is executed, those operand values are available within storage elements of the operand staging unit that have been allocated for the associated registers.

The scheduling circuitry is then arranged to select a thread group for which the capacity management circuitry has performed the operand setup process in respect of the region to be executed, and the thread processing circuitry then executes the instructions of the region of the selected thread group with reference to the registers as provided by the operand staging unit.

Hence, in accordance with the above described technique, the program code associated with a thread group is divided up into multiple regions, and for any region that requires access to an associated plurality of registers an operand setup process is performed prior to the scheduling circuitry being able to select that region for execution by the thread processing circuitry. For each such region, the capacity management circuitry has access to information enabling it to determine a sufficient number of storage elements which need to be reserved within the operand staging unit in order to ensure that the associated plurality of registers will be available to the region when that region is executed by the thread processing circuitry. Further, the capacity management circuitry is provided with information about which, if any, of those associated plurality of registers are input registers, and ensures that the operand values for those input registers are preloaded into storage elements allocated for those input registers, both of these steps being performed during the operand setup process. Only once the operand setup process has been performed will the scheduling circuitry then be able to select the relevant thread group so that the region of that thread group can then be executed by the thread processing circuitry.

By such an approach, the operand staging unit can be made significantly smaller than would be the case were a traditional register file provided having sufficient registers to maintain operand values for the active threads of all of the various thread groups. By dividing the program code up into regions, and by providing information about the registers required by each region, and which registers are input registers, the storage elements of the operand staging unit can be allocated dynamically during the operation of the apparatus, so that at the point a region is ready to be executed, sufficient space is allocated within the operand staging unit to provide the required registers, and the operand values for any input registers are preloaded. By such an approach, it can then be guaranteed that when the region is executed by the thread processing circuitry, the register requirements of the region will be met by the operand staging unit, and all of the required operand values can be accessed within the allocated storage elements of the operand staging unit.

The associated plurality of registers for a region may in one example arrangement comprise one or more of input registers, interior registers and output registers, where an interior register is a register whose operand value has a lifetime entirely within the region, and an output register is a register whose operand value is to be used as an input to a subsequent region of the associated program code. Whilst sufficient storage elements need to be allocated within the operand staging unit to allow all of these various registers to be accessed, it should be noted that the contents of the interior registers have a relatively short lifetime that is contained entirely within one region, so that it is not necessary for the operand values in any of the interior registers to be moved between the operand staging unit and the memory system (one or more levels of cache and main memory) of the apparatus. Only the operand values associated with input registers or output registers may need to be migrated between the operand staging unit and the memory system.

Further, it has been found that it is often the case that one or more of the regions can be chosen in a way that seeks to maximise the proportion of the associated plurality of registers that are interior registers, hence seeking to minimise the amount of traffic between the memory system and the operand staging unit, and hence minimising any associated performance impact resulting from loading of operand values from memory or the storing of operand values to memory. Further, it has been found that, to an extent there is a need to load or store any operand data values, those operand values can typically be maintained in a level one data cache, thereby alleviating any performance impact.

In one example arrangement, each region is an atomic region, such that once the scheduling circuitry has selected a thread group, the thread processing circuitry will complete execution of a current region of that selected thread group before that selected thread group is deselected. Hence, once a thread group has been allocated to the thread processing circuitry, the current region of that thread group will be executed through to completion, and only once execution of that region has completed will the thread group be deallocated. During that time, it can be guaranteed that the registers required by the various instructions being executed will be provided by the operand staging unit, due to the actions taken by the capacity management circuitry during the operand setup process.

In one example arrangement, the thread processing circuitry can be arranged to execute multiple thread groups at the same time, for each such thread group the thread processing circuitry executing a particular region. Hence, the execution of instructions from one thread group may be interleaved with the instructions of another thread group, whilst ensuring that each region of a thread group is processed in an atomic manner.

There are a number of ways in which the capacity management circuitry can be provided with the information required to enable it to perform the operand setup process. However, in one example, the capacity management circuitry has access to region information providing, for a thread group having a region of the associated program code that is ready to be executed, an indication of the number of storage elements that need to be reserved in order to provide the associated plurality of registers required to be accessed by the region, and identifying the registers that are input registers.

The region information can be provided in a variety of ways, but in one example the regions are determined at the time the associated program code is compiled, and the region information is provided by compiler annotations accessible to the capacity management circuitry. The compiler annotations can be made available to the capacity management circuitry in a variety of ways. However, in one example a number of metadata instructions are inserted at the start of each region, such metadata instructions being instructions that do not need to be executed by the thread processing circuitry but which, when decoded, provide the capacity management circuitry with the region information for that associated region.

The capacity management circuitry can be arranged in a variety of ways, but in one example maintains an indication of available capacity within the operand staging unit and, for a thread group having a region of the associated program code that is ready to be executed, is arranged to perform the operand setup process when the available capacity is sufficient to allow reservation of sufficient storage elements within the operand staging unit to provide the associated plurality of registers required to be accessed by the region.

In one example arrangement, at least by the time the thread processing circuitry has completed execution of a current region of a selected thread group, the storage elements used to provide the associated plurality of registers for that current region are added to the indication of available capacity.

In one example arrangement, the storage elements reserved for a particular region may stay reserved for that region until execution of the region has completed. However, in another example arrangement, under certain conditions, some of the storage elements can be freed up earlier in order to enable them to be included within the available capacity indication maintained by the capacity management circuitry, thereby potentially allowing the capacity management circuitry to be in a position to perform an operand setup process for other regions at an earlier stage than would be the case were all of the reserved storage elements maintained as reserved storage elements until execution of the region is complete.

In one example arrangement the associated program code is annotated to provide register lifetime indications identifying when a register is accessed for a last time within a region, the thread processing circuitry having access to the register lifetime indications and being arranged to cause a storage element within the operand staging unit to be marked as available once the register allocated to that storage element has been accessed for the last time within the region.

There are a number of ways in which storage elements within the operand staging unit may be marked as available. In one example, when the register that is used for the last time is an interior register, the thread processing circuitry is arranged to cause the corresponding storage element within the operand staging unit to be marked as free for a subsequent allocation. In particular, since at this point it is known that the operand value will not be required again, the storage element can effectively be marked as invalid, and no further action is required with regards to the current content of that storage element.

However, in one example, when the register that is used for the last time is other than an interior register, the thread processing circuitry is arranged to cause the corresponding storage element within the operand staging unit to be marked for eviction to a memory system coupled to the operand staging unit. In accordance with such an arrangement, then in one example the content of the storage element can be retained as valid, but be available as a candidate to be overwritten. However, if that storage element is subsequently selected to be used to store the operand value for another register, then a decision needs to be taken as to whether the current content needs to be evicted to the memory system. In one example arrangement, such a storage element can be added to a dirty list or a clean list of storage elements, dependent upon whether the current contents are more up to date than a copy kept in the memory system (i.e. the storage element is dirty), or the content of the storage element is the same as a copy kept in the memory system (i.e. the storage element is clean).

In one example arrangement, the annotations within the associated program code that provide the register lifetime indications distinguish between interior registers and registers other than interior registers. This hence readily enables a decision to be taken as to how a storage element should be marked when it is made available for being re-allocated.

Once a sufficient number of storage elements have been reserved within the operand staging unit by the capacity management circuitry, there are a number of ways in which individual of those reserved storage elements can be allocated to associated registers. In one example, for each input register a storage element from amongst the reserved storage elements is allocated to that input register when the associated operand value is preloaded, whilst storage elements from amongst the reserved storage elements are allocated to each other register as that other register is written to for the first time during execution of the region. Hence, in one example it is not necessary to allocate each of the reserved storage elements to particular registers at the outset, and instead this is only done for the input registers so that their associated operand values can be preloaded. For the other registers, storage elements are allocated to them as and when needed during execution of the region. In example arrangements where register lifetime information is also made available, and accordingly it can be determined when an operand value has been used for the last time, this also enables a particular reserved storage element to be used at different points in time during the execution of the region to store operand values for different registers. This can hence reduce the total number of storage elements that need to be reserved for a region.

The preloading operation performed as part of the operand setup process can be implemented in a variety of ways. However, in one example arrangement, when preloading the operand value for each input register into a reserved storage element allocated for that input register, the operand staging unit is arranged to perform a lookup operation to determine whether that operand value is already stored within one of the storage elements, and to otherwise retrieve the operand value from a memory system coupled to the operand staging unit. Hence, when adopting such an approach, a check can be performed to see whether the required operand value is already stored within a storage element of the operand staging unit. This for example can arise when execution of one region of a thread group finishes, and shortly thereafter the next region of the same thread group is subjected to the operand setup process by the capacity management circuitry. In particular, in one example arrangement the operand values of the output registers for the region has been completed may be marked for eviction, but may not yet have been evicted by the time the operand setup process is being performed for the next region. Accordingly, at the time the operand setup process is performed and the input registers are preloaded, it is likely that one or more of the required operand values for the input registers will still be present in storage elements of the operand staging unit, and accordingly do not in fact need to be fetched from the memory system. Only those for which a hit is not detected need to be fetched from the memory system. Such an approach can significantly reduce the time required to perform the preloading process.

The operand staging unit can be constructed in a variety of ways but in one example comprises a plurality of banks of storage elements, the plurality of banks being accessible in parallel. By using a banked arrangement, multiple register read and write operations can be processed in parallel, thereby improving performance.

The number of storage elements that need to be reserved by the capacity management circuitry during the operand setup process, in order to ensure that a sufficient number of storage elements are available to provide the associated plurality of registers required to be accessed by the region under consideration, can vary dependent on implementation. For instance, in one example arrangement the number of storage elements reserved may be based on the total number of registers that will be accessed by the region. However, in examples where the register lifetime indications are available, and hence it can be determined during execution of the region when certain operand values have been used for the last time, it is possible to reduce the total number of storage elements that need to be reserved. In particular, in one example arrangement, the capacity management circuitry is arranged, when performing the operand setup process, to reserve sufficient storage elements within the operand staging unit by reserving a number of storage elements sufficient to maintain operand values for a maximum number of registers within the associated plurality of registers that will hold live operand values at any point during execution of the region.

As mentioned earlier, it is often the case that many of the registers are interior registers whose operand value has a relatively short lifetime. As the instructions of a region are executed, the total number of live registers at any particular point in time will fluctuate up and down, but it is likely in many instances that the total number of live registers at any point in time is significantly less than the total number of registers accessed by the region. Hence, purely by way of example, if there are twenty separate registers that will be accessed during execution of a region, it may for instance be the case that the maximum number of live registers at any point in time is fourteen. In one example arrangement, if the capacity management circuitry has access to an indication of the maximum number of live registers, it would in that instance determine that it is only necessary to reserve fourteen storage elements rather than twenty.

As mentioned earlier, in one example the region information used by the capacity management circuitry is provided by compiler annotations added at the time the associated program code is compiled. Hence, in such an example, a compiler program can be arranged to divide the program code into a plurality of regions, and to then annotate the program code so as to provide, for each region that requires access to an associated plurality of registers, region information providing an indication of the number of storage elements that need to be reserved in order to provide the associated plurality of registers, and identifying the registers that are input registers.

There are a number of ways in which the compiler program can be arranged to create such region information. However, in one example, the compiler program is arranged to determine the regions into which the program code is to be divided by determining a set of candidate regions, and determining for each candidate region whether a set of constraints are met. In the absence of said constraint being met for any candidate region, it then further splits that candidate region to form multiple additional candidate regions and determining for each additional candidate region whether said set of constraints are met. When all of the candidate regions meet the set of constraints, it then selects those candidate regions as the regions into which the program code is to be divided.

The set of constraints can take a variety of forms, but in one example include one or more constraints that are identified with reference to the structure of the operand staging unit. For example, it may be determined that no one region should utilise more than a certain percentage of the storage elements provided by the operand staging unit. As another example, when the operand staging unit is arranged as a number of banks, then a maximum limit on the number of storage elements within a particular bank that can be used by any particular region may also be specified.

Particular examples will now be described with reference to the Figures.

FIG. 1 is a block diagram illustrating components provided within an apparatus in one example arrangement. Thread processing circuitry 30 is arranged to execute threads of thread groups. The techniques described herein can be used in situations where each thread group comprises a single thread (for example in a multithreaded processor employing simultaneous multithreading (SMT)), or where each thread group comprises multiple threads (as is often the case in GPU processing), the term "warp" often being used to refer to this latter variant of thread group. The techniques described herein are particularly beneficial in systems employing warp multithreading, due to the large amount of register state that typically applies to such systems.

Hence, in the examples described herein it will be assumed that each thread group comprises multiple threads, and each such thread group will be referred to herein as a warp. In one example, the threads within a particular warp are arranged to execute the same instructions, typically in relation to different data. In such a system, when a particular warp is selected for issuance to the thread processing circuitry, the instructions that each of the threads within the warp are to execute can be fetched in dependence upon a common program counter shared between the threads of that warp. Often when the threads of a warp are arranged to execute instructions in the above manner, the thread processing circuitry is referred to as adopting a Single Instruction Multiple Thread (SIMT) execution model.

As shown in FIG. 1, a buffer 10 is provided in which instructions fetched from the instruction cache 15 for each of the warps arranged to be executed by the thread processing circuitry 30 can be stored prior to those instructions being executed by the thread processing circuitry. In one example arrangement, the instructions are fetched in blocks of cache lines, and accordingly multiple instructions can be fetched and held within the buffer for each of the warps. Further, in one example those fetched instructions are at least partially decoded, such that the information maintained in the buffer provides the necessary control information to enable those instructions to be executed by the thread processing circuitry 30.

In accordance with the example arrangement of FIG. 1, rather than the thread processing circuitry 30 being provided with a register file providing sufficient registers to hold the register state of every live thread of the warps that may be executed on the thread processing circuitry, an operand staging unit 40 is provided that comprises a plurality of storage elements, and whose usage is controlled by a capacity manager 20 so as to dynamically allocate those storage elements in order to provide the registers necessary for each of the warps as they are executed by the thread processing circuitry 30.

Whilst in some instances all of the threads of a warp may be active, such that each thread is executed when that warp is issued to the thread processing circuitry, at some points in time only a subset of the threads may actually be active threads, and information can be maintained to identify at any point in time which are the active threads of each warp.

In one example arrangement, each warp has associated program code which is executed for each of the active threads within the warp, and at compilation time that program code is divided up into a number of regions. At least some of those regions require access to an associated plurality of registers, but the number of registers that need to be accessed by any particular region are typically only a subset of the total number of registers that may be specified by the instructions of the program code.

Furthermore, in accordance with the example arrangement of FIG. 1, the registers are categorised as being of three different types, dictated by the point at which the program code is divided into regions. In particular, the registers required by any particular region can comprise one or more input registers, interior registers and output registers. An input register is a register whose operand value is required before the region can be executed, and an output register is a register whose operand value is to be used as an input to a subsequent region of the program code. However, it is often the case that many of the registers referred to by the instructions within a region maintain operand values whose lifetime is entirely contained within the region, i.e. where an operand value to be written into one of those registers will be created by an instruction executing within the region, and then any use of that operand value will also be made by instructions executing within the region. Such registers are referred to herein as interior registers, and hence an interior register is a register whose operand value has a lifetime entirely within the region. In one example arrangement, the regions are arranged to be executed atomically by the thread processing circuitry, such that once the warp scheduler circuitry 25 has allocated a particular warp to the thread processing circuitry 30, the current region for that warp will be executed in its entirety by the thread processing circuitry before that warp is de-allocated from the thread processing circuitry. For a warp that has been scheduled by the warp scheduler circuitry, the thread processing circuitry can determine the necessary instructions to be executed by accessing the relevant information (fetched/decoded instructions) from the buffer 10, the information maintained within the buffer for each warp being referred to herein as a warp context.

For a warp that is currently not allocated to the thread processing circuitry 30 by the warp scheduler circuitry 25, the warp context maintained within the buffer 10 will identify one or more instructions appearing at the beginning of the next region of that warp to be executed. In one example, those initial instructions are arranged to be metadata instructions which are decoded to provide certain region information about the region of the warp that is awaiting execution. In one example, that region information can include information indicative of the number of registers that will be required to be accessed by the instructions within that region, and also will identify which registers are input registers, i.e. the registers whose operand value is required before the region can be executed. The capacity manager 20 can be arranged to refer to such register information within the buffer in order to perform an operand setup process with regard to the operand staging unit 40, prior to allowing the warp scheduler circuitry 25 to select such a warp for allocation to the thread processing circuitry 30.

In one example, the region information derived by the capacity manager from the warp context information in the buffer 10, for a warp that is waiting to be allocated to the thread processing circuitry 30, identifies the total number of registers that will be required to be accessed by the region, and provides an indication of the registers that are input registers. The capacity manager 20 maintains information about the usage of the operand staging unit 40, and in particular maintains information about the available capacity within the operand staging unit. It can hence determine whether there is sufficient capacity within the operand staging unit to provide the necessary registers that need to be accessed, and if so can reserve a sufficient number of registers within the operand staging unit. In addition, it can place a number of requests into the register preload queue 35 so as to cause the operand values for any input registers to be preloaded into the operand staging unit 40, this process being discussed in more detail later.

Whilst the operand staging unit can be arranged in a variety of ways, in one example it is constructed as a plurality of banks, and in that event the register preload queue 35 can be arranged to maintain a preload queue for each bank. During performance of the operand setup process, and in particular the processing of the preload requests from the register preload queue 35, if the operand staging unit 40 determines that the required operand value is not yet stored in one of its storage elements, it can retrieve the necessary operand value from the memory system, via an access to the level one data cache 45. In one example arrangement, it is expected that during operation many of the required input operand values will already be present within the operand staging unit, and those that are not present can be retrieved from the level one data cache 45.

Whilst in one example as described above the capacity manager may need to reserve a number of storage elements sufficient to allow storage elements to be uniquely allocated for each of the registers that are required to be accessed by a region of a warp awaiting allocation to the thread processing circuitry 30, in another example as discussed later the compiler is also able to annotate the code with indications of when registers are used for the last time during execution of the region, and this can enable storage elements to be freed up within the operand staging unit without waiting for the completion of execution of all of the instructions of the region. In such an arrangement, the number of storage elements that need to be reserved within the operand staging unit may be less than the total number of registers that are accessed by the region. In one such example, the region information provided in the buffer 10 instead identifies the maximum number of live registers at any point during execution of the region, and the capacity manager is arranged to reserve a number of storage elements having regard to that indication of the maximum number of live registers.

By virtue of the above described approach, whenever the warp context stored in the buffer 10 for a particular warp that is currently not allocated to the thread processing circuitry 30 indicates that the next region of that warp awaiting execution requires access to an associated plurality of registers, the capacity manager 20 is arranged to use the region information provided in that warp context to perform an operand setup process to ensure that sufficient space is reserved within the operand staging unit 40, and that the operand values of any input registers are preloaded into the operand staging unit, before allowing the warp scheduler circuitry 25 to select that warp for allocation to the thread processing circuitry 30. As a result, by the time the warp scheduler circuitry 25 is allowed to select such a warp, it can be guaranteed that there is sufficient reserved space within the operand staging unit to provide all of the plurality of registers that will be required to be accessed during execution of that region. It can also be guaranteed that whenever the content of such a register is read during execution of the instructions, that content will be present within the associated storage element allocated for that register within the operand staging unit, and hence a miss event will not occur when reading operand values from the operand staging unit.

As shown in FIG. 1, the thread processing circuitry 30 typically includes an execution pipeline 55 for performing the data processing operations defined by the various instructions of the region of each warp allocated to the thread processing circuitry 30. The register read circuitry 50 is arranged to initiate read operations in respect of the operand staging unit 40 in order to obtain source operand values required during execution of the instructions. The register write back circuitry 60 can then write result data to a destination register by accessing the appropriate storage element within the operand staging unit. As will be discussed in more detail later, in one example arrangement, for write operations the register read circuitry will initiate a lookup operation within the operand staging unit for the required register, which will result in the identification of an index value to identify the particular storage element into which the result should be written. This index value can be propagated through the execution pipeline 55 to the register write back stage 60 so that at the write back stage the register write back circuitry can merely specify that index value, along with the operand value to be written, allowing the operand staging unit content to be updated without needing to perform a further lookup operation at the write back stage. This reduces complexity by avoiding the need for a further lookup operation at the write back stage, and can also improve performance.

Whilst not explicitly shown in FIG. 1, the operand staging unit 40 can be arranged to include arbitration logic as required to arbitrate between the various sources of requests issued to the operand staging unit, namely the requests from the preload queue 35, the register read circuitry 50 and the register write back circuitry 60.

Whilst as discussed earlier each region of a warp will be executed atomically, and accordingly once a warp has been selected by the scheduling circuitry 25 for allocation to the thread processing circuitry 30, the thread processing circuitry 30 will execute the entirety of the next region for the that allocated warp, the thread processing circuitry can execute multiple warps concurrently, and accordingly at any point in time there may be multiple warps whose current regions are in the process of being executed by the thread processing circuitry 30.

Figure 2:
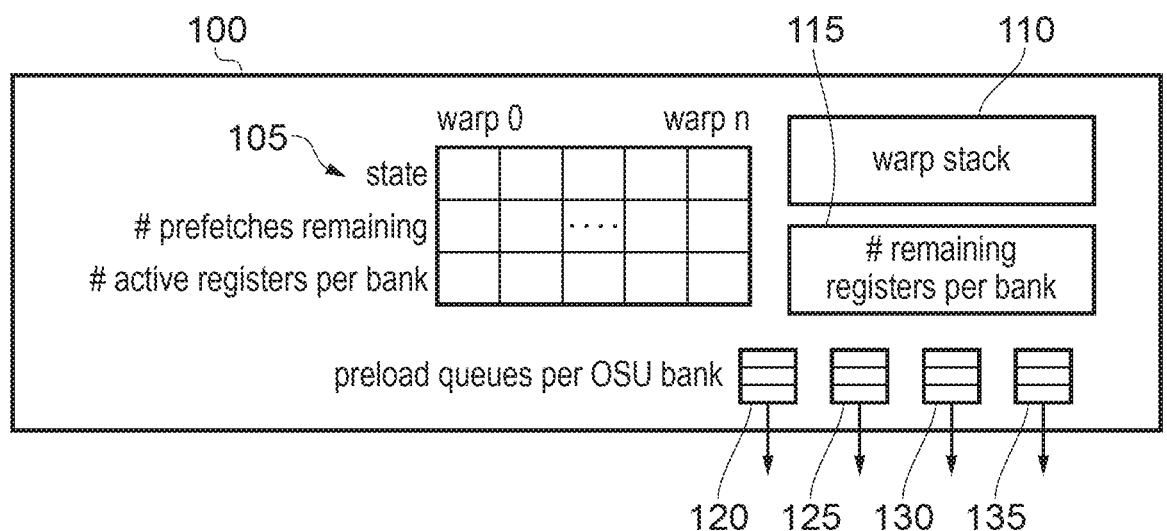
FIG. 2 illustrates the capacity manager of FIG. 1 in accordance with one example arrangement.

FIG. 2 is a block diagram illustrating components that may be provided within the capacity manager. In this example, the capacity manager is considered to include the necessary preload queues, and accordingly the elements 20, 35 of FIG. 1 are included within the block 100 shown in FIG. 2. A storage element 115 is arranged to maintain available capacity information for the operand staging unit, and in particular information about the number of storage elements that are not currently reserved for a particular region. It should be noted that this information does not need to identify particular storage elements, but just the quantity of storage elements available, as in one example the storage elements are actually allocated to registers as and when required during the processing of regions by the thread processing circuitry 30.

As mentioned earlier, the operand staging unit 40 can be arranged in a variety of ways, but for the purpose of the following detailed discussions it will be assumed that the operand staging unit is arranged as a plurality of banks. In that instance, the information maintained within the storage element 115 can identify, for each of those banks, the number of remaining registers within that bank.

The warp stack 110 is arranged to maintain an indication of the warps that are not currently allocated to the thread processing circuitry, as each warp is de-allocated it being added to the top of the stack.

The storage 105 is used to maintain information about each of the warps for which warp context is maintained within the buffer 10, i.e. for each of the warps that may be executed on the thread processing circuitry 30. For each such warp, the storage 105 maintains a state indication, which in one example identifies whether that warp is in an inactive state (i.e. is not allocated to the thread processing circuitry and is not currently the subject of any preloading activity), is in a preloading state (indicating that the capacity manager is currently in the process of performing the earlier mentioned operand setup process to reserve sufficient space within the operand staging unit), or is in an active state (meaning that any preloading has been completed, and the warp is hence ready to be allocated by the scheduler circuitry to the thread processing circuitry 30). In addition, a field is maintained for each warp identifying the number of prefetches remaining. For a warp in the inactive or active state, this field is not used, but during the preloading state this information identifies how many preloading operations are still remaining. In particular, only once all of the preloading operations have been completed, and hence the number of prefetches remaining has reduced to zero, can the state be updated from the preloading state to the active state.

Further, in one example, as shown in FIG. 2, an additional field maintained for each warp identifies the number of active registers for that warp. In particular, in one example, this information is maintained separately for each of the banks, and is set to identify the maximum number of live registers required by the current thread of the warp, on a per bank basis, this information being determined from compiler annotations.

As shown in FIG. 2, preload queues 120, 125, 130, 135 can be provided for each of the banks within the operand staging unit, and when a particular warp enters the preloading state, the capacity manager will then place preload requests into the appropriate preload queues in order to cause the operand value for any input registers to be preloaded into the operand staging unit (OSU).

The way in which individual registers can be mapped to storage elements within the banks of the OSU can vary dependent on implementation. However, in one example arrangement the registers are assigned to a bank by using a combination of bits of the warp ID and the register number, in one particular example this being done by taking the lower three bits of the sum of the warp ID and the register number. In one particular example, the compiler can be arranged so that it selects register numbers in a manner that reduces bank conflicts.

In one example arrangement, each register (r1, r2, r3, . . . ) has a fixed assignment to a bank, e.g. r1=>0, r2=>1, r3=>2, r4=>3, r5=>0, and so on (as mentioned above there is also some adjustment based on the warp ID). The structure of the program dictates which data needs to be moved between instructions, and the registers are used to move this data. The compiler may assign register numbers after creating the regions such that the bank usage in each cluster is the most balanced.

Figure 3A:
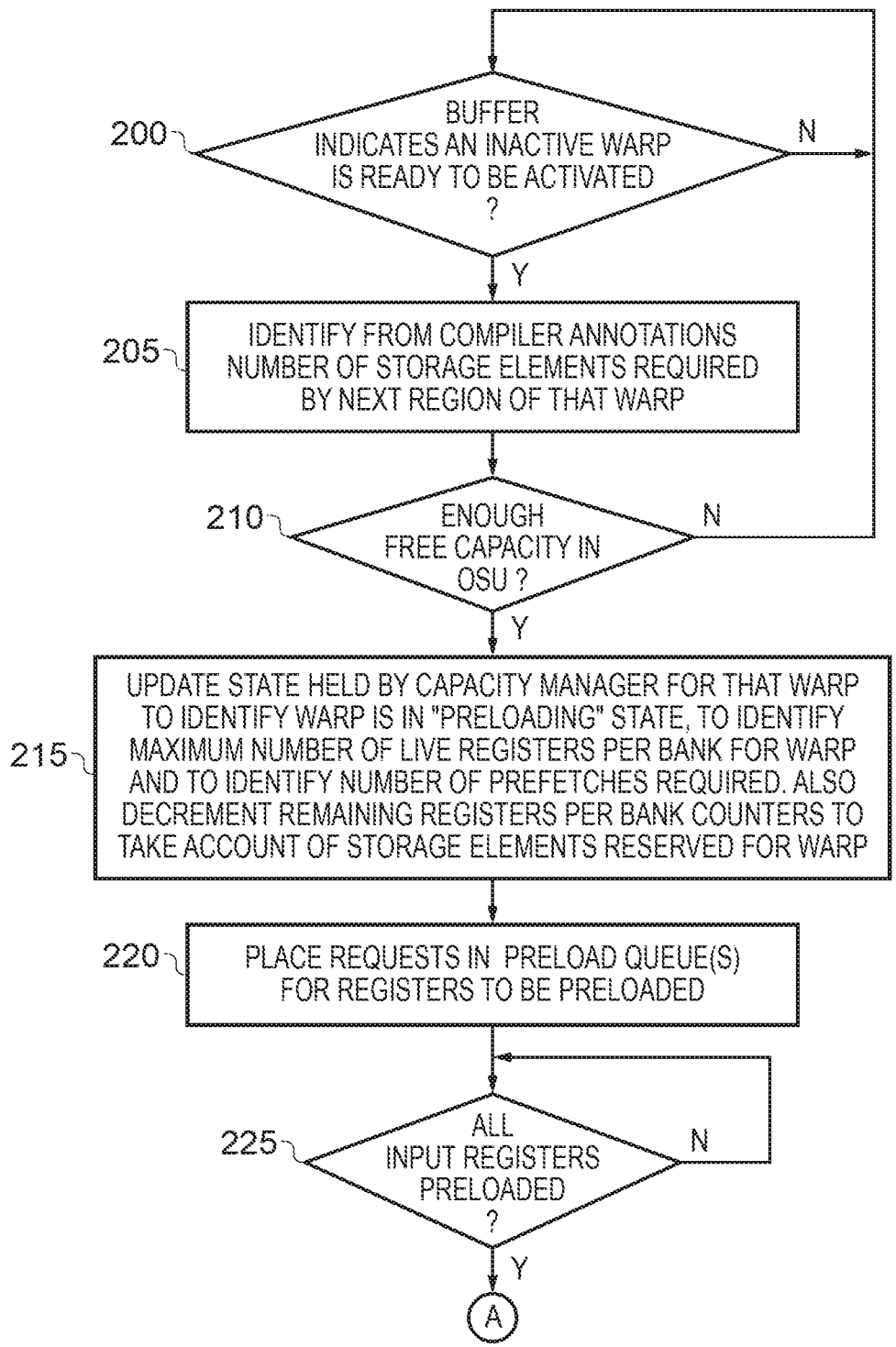
FIGS. 3A and 3B are a flow diagram illustrating the operation of the capacity manager in one example.
Figure 3B:
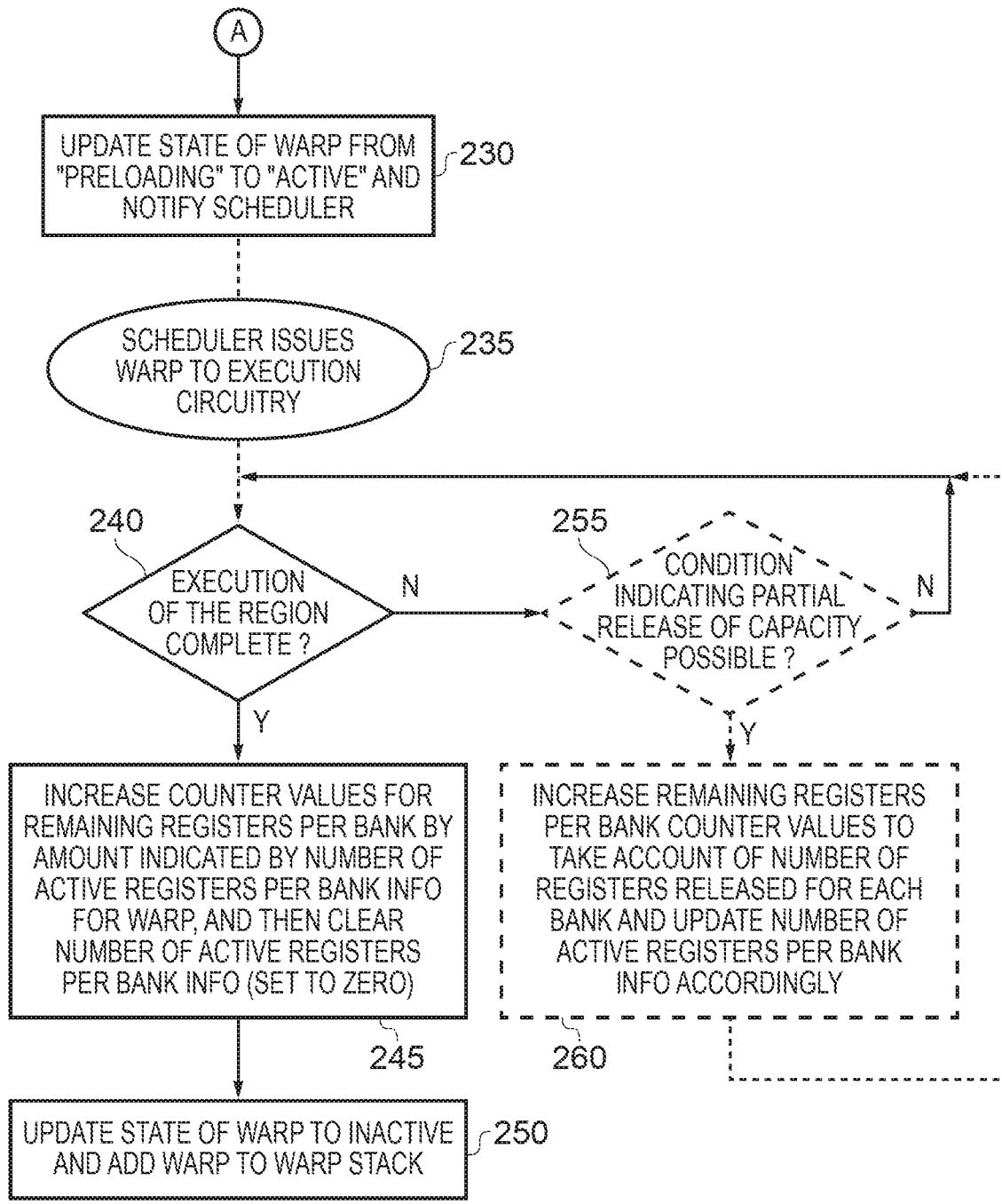

FIGS. 3A and 3B provide a flow diagram illustrating the operation of the capacity manager of FIG. 2 in one example. At step 200, it is determined whether the buffer 10 indicates that there is an inactive warp that is ready to be activated. In an example implementation, it is expected that the instruction fetching mechanism performed with reference to the instruction cache 15 is such that it will typically be the case that for a warp that is not currently allocated to the thread processing circuitry, instructions will have been fetched and decoded for the next region of that warp, and hence the buffer 10 will indicate that that warp is ready to be activated. Hence, at step 200 it may often be the case that the capacity manager circuitry needs to select one such warp from amongst a number that could be chosen from the buffer 10. In one particular example this is done by reference to the warp stack 110, and in particular the capacity manager is arranged to preferentially select a warp that has only recently been deactivated. In such an implementation, the check at step 200 involves determining whether the warp at the top of the stack (which will be the most recently de-allocated warp) is ready to be reactivated. If not, then the next entry down in the warp stack can be considered, and so on.

This can provide beneficial performance, since as will be apparent from the later discussion of the detailed operation of the operand staging unit, when output registers are freed as an available resource, their contents are not automatically at that time evicted from the operand staging unit to the memory system, and accordingly if a warp is reallocated soon after it is de-allocated, it is more likely that the operand values of any required input registers will still be present within a storage element of the operand staging unit, hence reducing the time taken to perform the necessary preloading operations.

As a result of performing step 200, then assuming there is one or more warps that are ready to be activated, one of those warps will be selected as discussed above, and then at step 205 the capacity manager will determine, from the compiler annotations present within the warp context information held in the buffer 10, the number of storage elements required by the next region of that warp. As mentioned earlier, this information can be derived from decoded metadata instructions maintained within the buffer 10 as part of the warp context. In particular, in one example the number of storage elements required is determined having regards to the maximum number of live registers that will occur at any point during execution of the region. Hence, purely by way of example, it may be that the total number of registers accessed during execution of the region is 20 registers, but the lifetime of some of those registers may not overlap with the lifetime of others, and accordingly it could for example be the case that the maximum number of live registers at any point in time is 14. In that event, the capacity manager would identify at step 205 that the number of storage elements that need to be reserved is the number of storage elements sufficient to provide the operand values of 14 registers.

Following step 205, it is then determined at step 210 whether there is enough free capacity in the operand staging unit, this being determined with reference to the information maintained in the storage 115 discussed earlier with reference to FIG. 2. In one particular example, the compiler annotations can provide sufficient information to enable a determination to be made of the number of storage elements that need to be reserved within each bank, and that information can be used in combination with the various counters in the storage 115 in order to determine at step 210 whether there is enough free capacity in the operand staging unit.

If there is not enough free capacity, then the process returns to step 200, where for example the capacity manager may choose a different inactive warp that is ready to be activated. However, assuming there is enough free capacity determined to be present at step 210, then at step 215 the capacity manager is arranged, within the warp state maintained in the storage 105, to update the state field for the relevant warp to identify that that warp is in the preloading state, and to identify the number of prefetches required by setting an initial value for the number of prefetches remaining. In addition, the number of active registers per bank information will be updated based on information provided in the compiler annotations. In one example configuration, the number of active registers per bank information within the storage 105 will be set to identify the maximum number of live registers per bank as derived from the compiler annotations.

In addition, the required number of storage elements will be reserved within the operand staging unit by reducing the per bank counters maintained within the storage 115 by the required amount (in one example this is done by decrementing, for each bank, the remaining registers counter by the maximum number of live registers indicated for that bank by the compiler annotations). This will ensure that for any subsequent performance of the operand setup process by the capacity manager, account will be taken of the number of storage elements that have just been reserved for the current warp.

As shown by step 220, the capacity manager also places requests in the necessary preload queues 120, 125, 130, 135 for each input register identified in the compiler annotations.

The process then proceeds to step 225, where the capacity manager awaits completion of all the preloading operations. In particular, as will be discussed later when discussing the operation of the operand staging unit, as each preloading operation is completed, the capacity manager will be notified, and accordingly can decrement the number of prefetches remaining information for the relevant warp. When the number of prefetches remaining reaches zero, then this indicates that all of the input registers have been preloaded, and the process can proceed to step 230, where the state of the associated warp is changed from "preloading" to "active". At that point the warp scheduler circuitry 25 is notified that the associated warp is available for the scheduler to allocate to the thread processing circuitry 30. Accordingly, the scheduler will subsequently issue that warp to the execution circuitry, as indicated by the entry 235 in FIG. 3B.

The capacity manager 20 then checks, at step 240, whether execution of the region is complete. This will be the case once all of the instructions of the region have been executed by the thread processing circuitry. If so, then the process proceeds to step 245, where the counter values within storage 115 identifying the remaining registers per bank are increased by the values held in the active registers per bank information for the relevant warp within storage 105. In addition, the active registers per bank information in storage 105 for the relevant warp is then cleared, for example by resetting the counter values held therein to zero. Thereafter, at step 250, the state field for the relevant warp can be updated to identify the inactive state, at which point an indication of that warp is then added to the warp stack 110.

In one example arrangement, the process of FIG. 3B waits at step 240 until it can be confirmed that execution of the region is complete (although in the meantime the capacity manager can perform operand setup operations for other warps). However, as indicated by the dotted boxes 255, 260, in an alternative configuration a further optimisation can be provided that potentially allows at least some of the capacity reserved for a particular warp to be released before execution of its current region has necessarily completed. In particular, at step 255, it is assessed whether a condition is detected that indicates that the partial release of the capacity is possible. In particular, by referencing the warp context within the buffer 10, it can be determined when all of the instructions of the region have been issued to the thread processing circuitry, since in that instance the warp context will identify the one or more metadata instructions relating to the next region. In that instance, it can be assessed what operations are yet to be completed by the thread processing circuitry in order to assess whether the above-mentioned condition is present.

In one example, this can occur when completion of the region is waiting on completion of at least one register write operation that is writing to an output register that is marked for eviction immediately after being written. It may be the case that such write operations can take a relatively long time to complete, and in one embodiment the storage elements not associated with the register being written to can be freed without awaiting completion of such a write operation.

In particular, if at step 255 a condition is detected that indicates partial release of the capacity is possible, then the process proceeds to step 260, where the remaining registers per bank information 115 is adjusted by incrementing the per bank counters to take account of the number of registers per bank that are no longer required. In addition, the number of active registers per bank information can then be adjusted by decrementing the relevant counters. Thereafter the process returns to step 240. Purely by way of example, if it is determined that the only operations remaining are write operations to an output register in bank 1 and an output register in bank 2, then the number of active registers per bank information for the relevant warp can be adjusted so as to only identify one active register for bank 1 and one active register for bank 2, with all of the counters for the other banks associated with that warp in storage 105 being cleared to 0. The counters within the remaining registers per bank storage 115 are incremented to take account of the adjustment being made to the active registers per bank information within the storage 105 for the warp in question.

By enabling storage elements to be freed up in such instances, this can significantly improve the efficiency, and reduce the overall storage requirements of the operand staging unit. Purely by way of example, if the last instruction in the region is a global load, the required operand value may take hundreds of cycles to be written back into the required register. While this process is ongoing, in accordance with the above described technique any other storage elements that were reserved for that region can be freed for other warps, but the storage element allocated to the pending register stays allocated. Once the final register has been written to, the capacity manager can detect completion of the region, at which point the final storage element can be reclaimed and the warp can then be deactivated and pushed onto the warp stack. However, in that intervening period all of the other storage elements will have been freed up as available capacity for the capacity manager, enabling the capacity manager to perform the operand setup process for one or more other warps.

Figure 4:
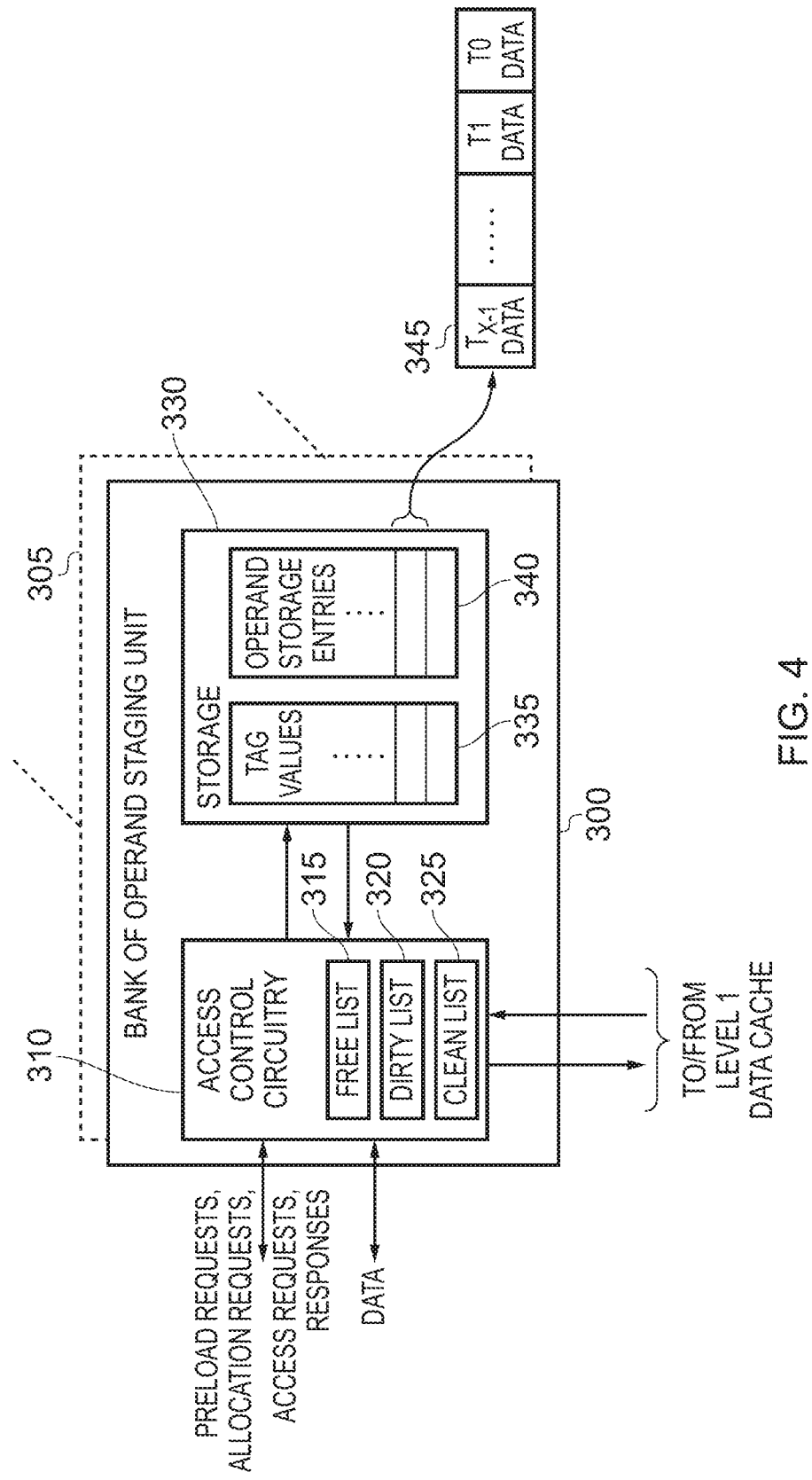
FIG. 4 is a diagram illustrating in more detail the operand staging unit of FIG. 1 in accordance with one example arrangement.

FIG. 4 is a diagram illustrating in more detail the operand staging unit 40 of FIG. 1 in one example. In this example, the operand staging unit comprises a plurality of banks 300, 305, each of which can be arranged as illustrated for the bank 300. In particular, storage 330 is provided that includes both TAG storage 335 and operand value storage 340. In this example, each operand storage element (also referred to herein as an operand storage entry) is sufficient to store the operand value for a particular register, and as shown by the expanded example 345, the operand value will actually contain a data block for each thread within a warp. Hence, if a warp has X threads, then the storage element 345 may contain a data block for each of the X threads.

For each operand storage element within the storage 340, there is a corresponding TAG entry within the TAG storage 335, that TAG entry maintaining information sufficient to identify a register, and the warp to which that register relates. In one particular example, each TAG entry will store the warp ID and the register ID.

Access control circuitry 310 is used to perform lookup operations within the storage 330, to perform allocation operations to allocate particular storage elements to particular registers, to invalidate any entries (including performing any associated eviction operations required), and to maintain information about the status of any entries that are not currently allocated to particular registers. With regards to this latter point, the access control circuitry 310 can maintain a number of lists, in the particular example of FIG. 4 these including the free list 315, the dirty list 320, and the clean list 325. In one example, when an interior register is written to for the last time, the entry can merely be invalidated, and that storage element added to the free list 315. However, for registers that are not interior registers, when those registers are used for the last time within a region they can instead be added to the dirty list or the clean list, depending on whether the current contents of that storage element are more up-to-date than the contents within the memory system or not. In particular, if the contents are more up-to-date, the entry can be added to the dirty list 320, whereas if the data content merely mirrors the content in the memory system, then it can be added to the clean list 325. How these various lists are used will be discussed later with reference to FIGS. 5A to 5D.

The access control circuitry 310 can receive requests from a variety of sources, for example from the preload queue 35, the register read circuitry 50 or the register write back circuitry 60 shown in FIG. 1. It can also issue acknowledgements back to those components, and can return read data to those components as required or receive write data from those components. The access circuitry can also interface to the level 1 data cache 45 so as to perform load and store operations as required during the execution of instructions on the thread processing circuitry 30. In particular, load operations will be used to load data from the memory system into one or more storage elements, and store operations can be used to store the contents from storage elements back into the memory system.

Figure 5A:
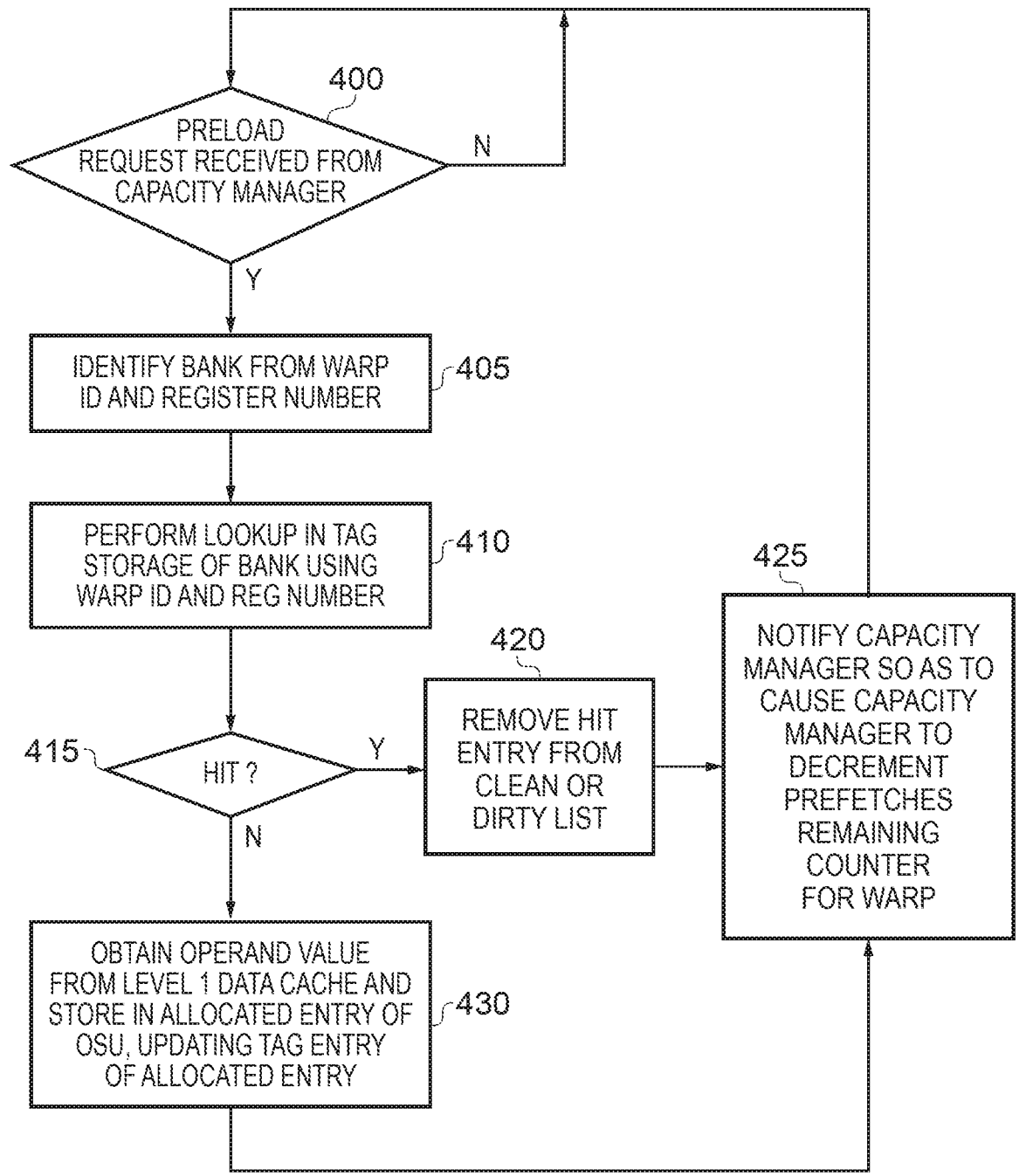
FIGS. 5A to 5D are flow diagrams illustrating how the operand staging unit processes received requests, and updates various lists, in accordance with one example.

FIG. 5A is a flow diagram illustrating the operation of the operand staging unit when processing preload requests received from the register preload queue(s). At step 400, it is determined whether a preload request is received from the capacity manager. If so, then the relevant bank to be accessed can be identified from the warp ID and the register number at step 405. In an alternative example, this step may not be required at this point, as there will be separate preload queues for each bank, and accordingly the appropriate bank can be determined based on the queue from which the request is received.

At step 410, a lookup operation is performed in the TAG storage 335 for the relevant bank using the warp ID and register number provided by the preload request, in order to see if there is a hit within the storage 330. In one example, the storage 330 is arranged as a fully associative structure, and accordingly any register can be allocated to any of the entries. This significantly simplifies the process performed by the capacity manager when determining if there is enough free capacity in the operand staging unit, since it is only sufficient to maintain an overall indication of the number of available entries, given that any entry can store any register content.

If a hit is detected at step 415, then this will mean that the operand value is already stored within one of the storage elements that is currently marked within either the clean or the dirty list, dependent on whether the current content is more up-to-date than the memory system content or not. Accordingly, at step 420, that storage element is removed from the clean or dirty list, and at step 425 the capacity manager is notified so as to cause the capacity manager to decrement the number of prefetches remaining counter for the relevant warp, whereafter the process returns to step 400.

If a hit is not detected at step 415, then the access control circuitry 310 will initiate access to the level 1 data cache in order to retrieve the required operand value, and will allocate one of the available storage elements into which the operand value returned from the level 1 data cache will be written. In addition to writing the data into the allocated storage element, the associated TAG entry will be updated to identify the warp and the register number. When a register is allocated, an entry is used from the free list if possible, as it is known that the current content will not be needed by any future executing region, and no clean up operations are required in respect of that data. If there is not an available entry in the free list, then an entry may be chosen from the clean list 325 assuming there is an available entry. In one example, only if there is no entry in either the free list or the clean list will an entry be allocated from the dirty list 320. Both the entries in the clean list and the dirty list may identify operand values that could be used by a subsequent region, but there is more overhead associated with using an entry from the dirty list, as it will be necessary to perform an eviction operation to evict the current contents to memory, before those current contents can be overwritten. Hence, it is generally preferable to choose an entry from the clean list rather than the dirty list if one is available.

Once step 430 has been performed, then the capacity manager is again notified at step 425 so that it can decrement the number of prefetches remaining.

Whilst FIG. 5A is shown as a serial process, in examples where the multiple preload queues 120, 125, 130, 135 are used, a preload request from each queue can be processed in parallel, i.e. one preload request per bank.

As mentioned earlier, the operand staging unit 40 can include arbitration circuitry to arbitrate between requests coming from the preload queue(s) 35, the register read circuitry 50 or the register write back circuitry 60. In one example, preference will be given to the register read circuitry and the register write back circuitry, as the requests issued by those components relate to active threads being processed by the thread processing circuitry, and the preload requests will be processed by each bank as and when those banks have availability to process those requests.

Figure 5B:
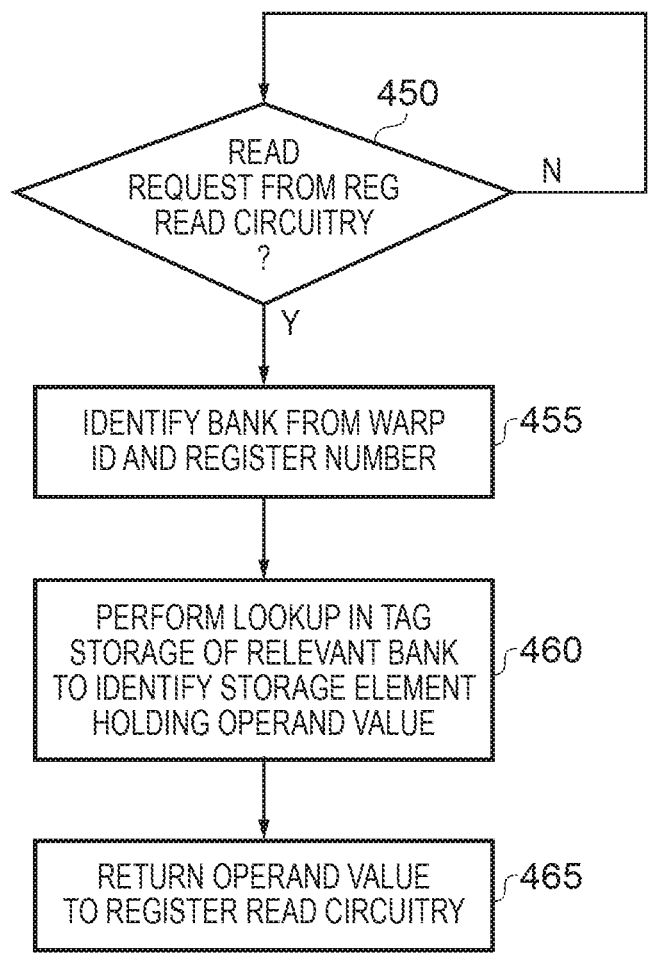

FIG. 5B is a flow diagram illustrating how read requests from the register read circuitry 50 are processed by the operand staging unit 40. Once a read request is received at step 450, then the bank to be accessed is identified from the warp ID and the register number provided by the register read circuitry 50 (see step 455). A lookup is then performed at step 460 in the TAG storage of the relevant bank to identify the storage element holding the operand value. It should be noted that in the described example arrangement it can be guaranteed that there will always be a hit at the time a read request is received by the register read circuitry. In particular, any input registers will have already had their operand values preloaded prior to the thread processing circuitry 30 beginning to execute the code of the region, and for any interior registers the operand values will have been created and written to those registers prior to any reading taking place.

Accordingly, following step 460, the operand value retrieved from the hit entry can be returned to the register read circuitry 50 for passing to the execution pipeline 55 (step 465).

Figure 5C:
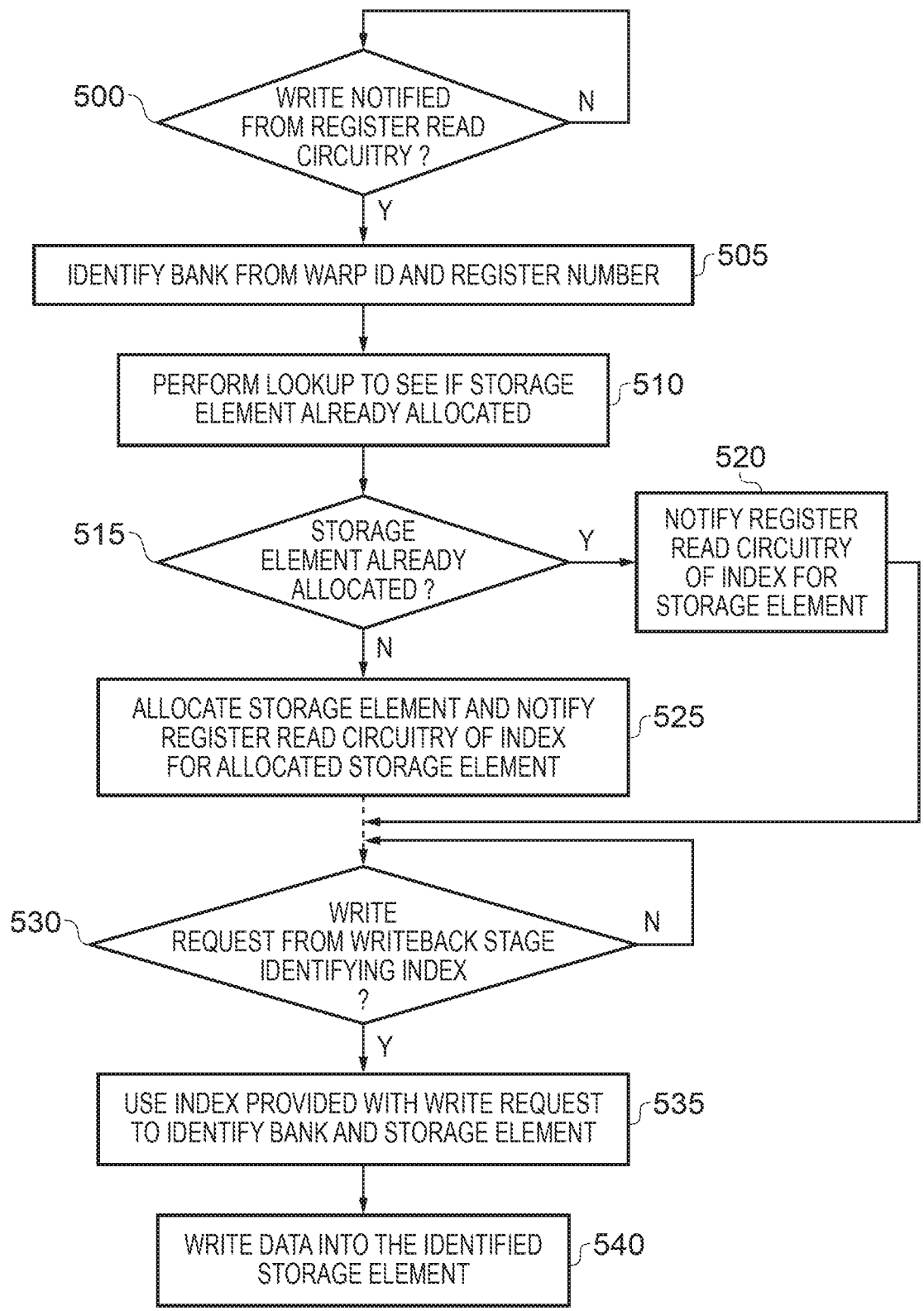

FIG. 5C is a flow diagram illustrating how write requests are processed in accordance with one example arrangement. In particular, when it is determined by the thread processing circuitry 30 that a write is required, this will actually be detected by the register read circuitry 50, and accordingly at step 500 the operand staging unit will determine whether a write has been notified from the register read circuitry. If so, then at step 505 the bank is identified from the warp ID and the register number provided as part of the write notification, and then a lookup is performed in the relevant bank at step 510 to see if a storage element has already been allocated for that register and warp ID.

If at step 515 it is determined that a storage element has already been allocated, then the operand staging unit notifies the register read circuitry of the index information required to access that particular storage element at step 520.

If a storage element has not already been allocated, then the process then proceeds from step 515 to step 525, where a storage element is allocated for the required register, and then the register read circuitry is notified of the index for that allocated storage element. As with the earlier described step 430 of FIG. 5A, an entry will preferentially be allocated from the free list 315, assuming there is an entry in the free list, and will otherwise be selected from the clean list if there is an entry, or failing that from the dirty list 320.

Following steps 520 or 525, the process will wait at step 530 for a write request from the write back stage that identifies that index information. Since the write request will directly specify the index information, there is no need at that point to perform another lookup operation, and instead at step 535 the index information provided with the write request is used to identify the bank and the storage element, and thereafter at step 540 the write data provided from the register write back circuitry 60 is written into the identified storage element.

Such an approach provides further efficiency benefits. In particular, supporting tag lookup operations from multiple sources is relatively expensive, and in accordance with the approach of FIG. 5C there is no need to perform any such tag lookups in association with the register write back operations. Instead, tag lookups are only required to be supported in respect of preload requests from the preload queue 35 or requests from the register read circuitry 50.

Figure 5D:
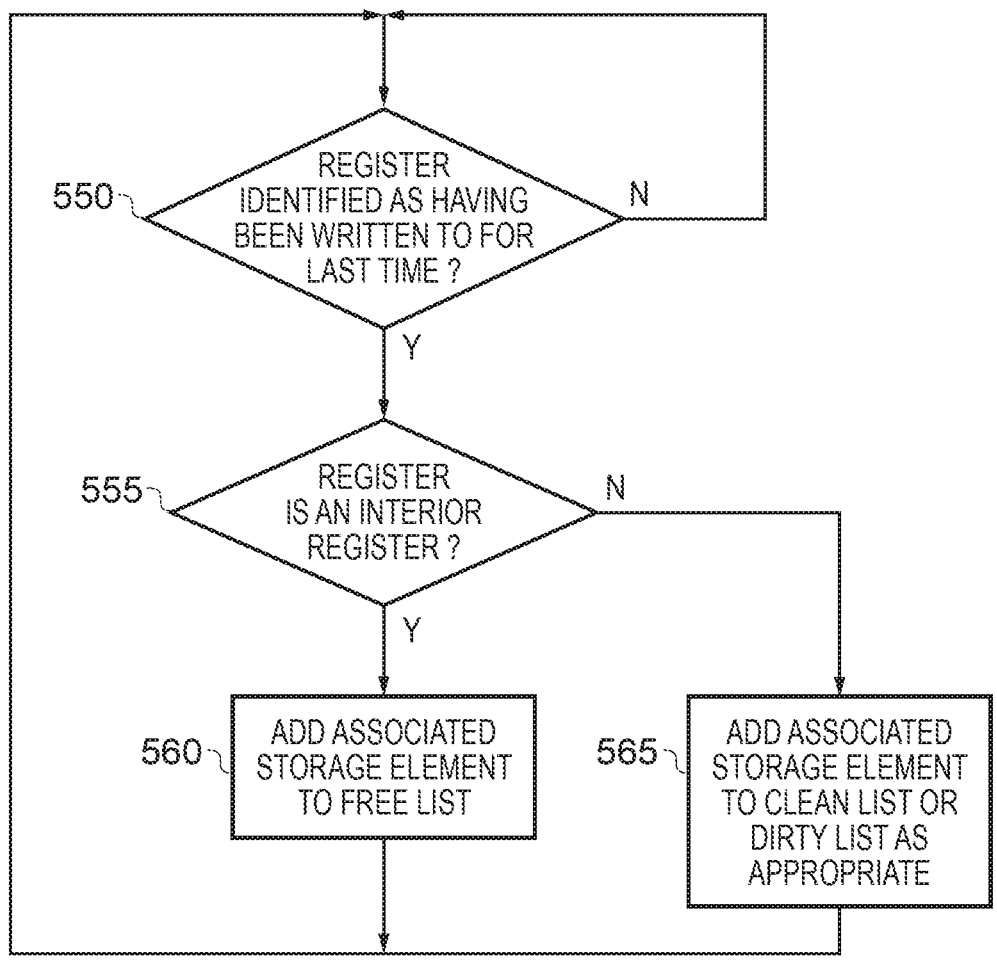

As mentioned earlier, the compiler can annotate the code with register lifetime information, so that the thread processing circuitry can determine during execution when registers have been referred to for the last time. On occurrence of such an event, the associated storage element within the operand staging unit can be made available as capacity to be used for subsequent register allocations. This process is illustrated in FIG. 5D, for one example arrangement.

At step 550, the operand staging unit 40 awaits receipt of an indication from the thread processing circuitry 30 of a register that has been identified as being written to for the last time. At that point the relevant storage element within the operand staging unit can be made available as freed up resource for later allocation to another register, by adding the storage element to appropriate one of the lists 315, 320, 325. Hence, at step 555, it is determined whether the register is an interior register. In one example, when an interior register is written to for the last time, the associated storage element can merely be invalidated, and the process proceeds to step 560 where that storage element is added to the free list 315. However, for a register that is not an interior register, when that register is used for the last time within a region, the process proceeds to step 565 where the associated storage element is instead added to the dirty list or the clean list, depending on whether the current contents of that storage element are more up-to-date than the contents within the memory system or not. In particular, if the contents are more up-to-date, the storage element is added to the dirty list 320, whereas if the data content merely mirrors the content in the memory system, then the storage element is added to the clean list 325.

Figure 6A:
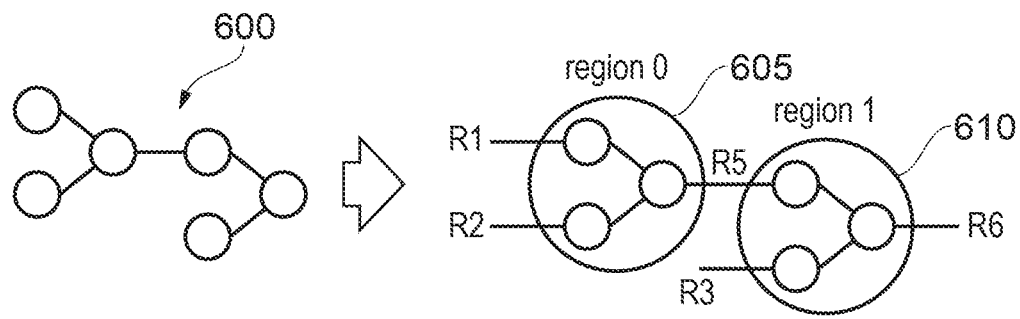
FIGS. 6A to 6D schematically illustrate the methodology employed in accordance with the described examples.

FIGS. 6A to 6D schematically illustrate the process performed by the above described examples. Firstly, as shown in FIG. 6A, at compile time the program code 600 is divided into regions of instructions 605, 610. The compiler can then provide annotations indicative of the number of registers used within each region, and indications of which registers are input registers (and if desired which registers are output registers). By appropriate selection of the division points, regions can be selected so that the vast majority of the registers required are interior registers with relatively short lifetimes, and as such the regions will typically have a small number of input and output registers compared to the number of registers which are both produced and consumed inside the region.

Figure 6B:
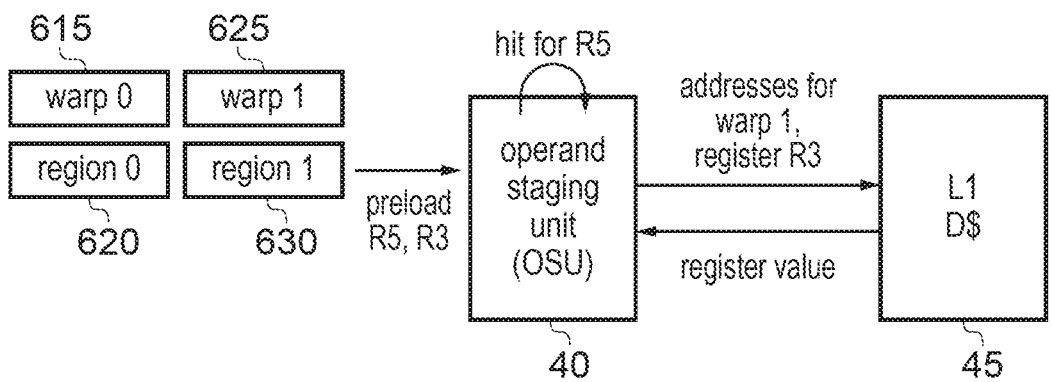

As shown schematically in FIG. 6B, as regions associated with particular warps become ready for allocation to the thread processing circuitry, sufficient space within the operand staging unit 40 is reserved for those registers, and the operand values for any input registers are preloaded. Hence, in this example, it is assumed that warp 0 615 is currently executing region 0 620, and that sufficient storage elements have already been reserved within the OSU 40 for that region. It is also assumed that warp 1 625 is ready to execute region 1 630, and accordingly the capacity manager performs the earlier described operand setup process for region 1 of warp 1. In this particular case it is assumed that registers R5 and R3 are input registers, and accordingly preload operations are initiated for those two registers. In this particular example shown in FIG. 6B, it is assumed that a storage element already stores the operand value for register R5, and hence as will be apparent from the earlier discussion of FIG. 5A all that is necessary in respect of that storage element is to remove it from the clean or dirty list. It is assumed in this example that a miss occurs for register R3, and accordingly a request is issued to the level 1 data cache 45 to retrieve the register value for register R3, whereupon that value will be stored within an allocated register within the operand staging unit.

Figure 6C:
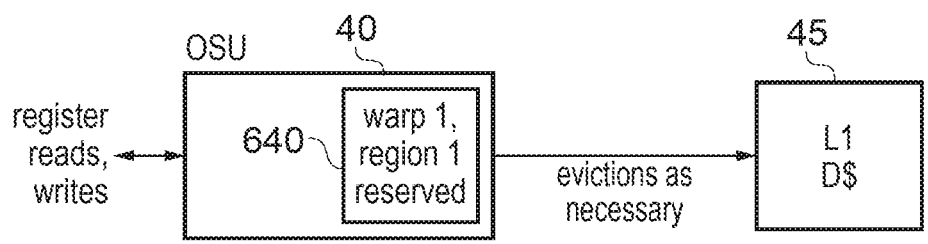

FIG. 6C schematically illustrates a block of storage elements 640 reserved for region 1 of warp 1 within the OSU 40. As region 1 of warp 1 executes, all of the required registers are serviced using storage elements within the OSU 40. When output values are produced, they are saved in storage elements allocated to output registers within the OSU, and as they are used for the last time they can be marked for eviction. As discussed earlier eviction does not necessarily need to occur immediately and instead an identification of the relevant storage elements can be maintained within the dirty and clean lists. This avoids unnecessary transfer of data between the OSU 40 and the level 1 data cache 45.

Figure 6D:
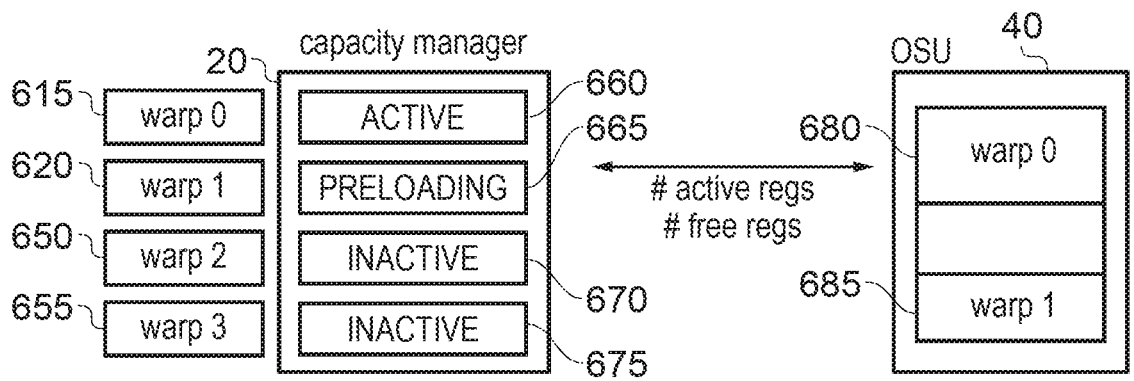

As shown schematically in FIG. 6D, the capacity manager 20 orchestrates the above process by actively managing the OSU capacity. For each possible warp that may be executed on the thread processing circuitry 20 (in the example of FIG. 6D the four warps 615, 620, 650, 655), the capacity manager can maintain status information 660, 665, 670, 675 identifying which of those warps are active, which are inactive, and which are in a preloading state. In this example, it is assumed that warp 0 615 is active and that a block of storage element 680 have been reserved for that warp, and it is assumed that warp 1 620 is preloading, and that a block of storage elements 685 have been reserved for that warp. As will be apparent from the earlier discussions, the capacity manager keeps an indication of the available capacity within the OSU, hence enabling it to decide whether there is sufficient capacity to begin performing an operand setup process for another warp awaiting allocation to the thread processing circuitry. As will be apparent from the earlier discussions, the capacity manager makes a warp eligible to issue instructions into the thread processing circuitry only when all the warp's input registers for its next region are present and there is sufficient space for the required registers of the region to be serviced from the OSU. As warps complete regions, their registers are reclaimed and the capacity manager uses the free capacity to preload registers for a new region.

Figure 7:
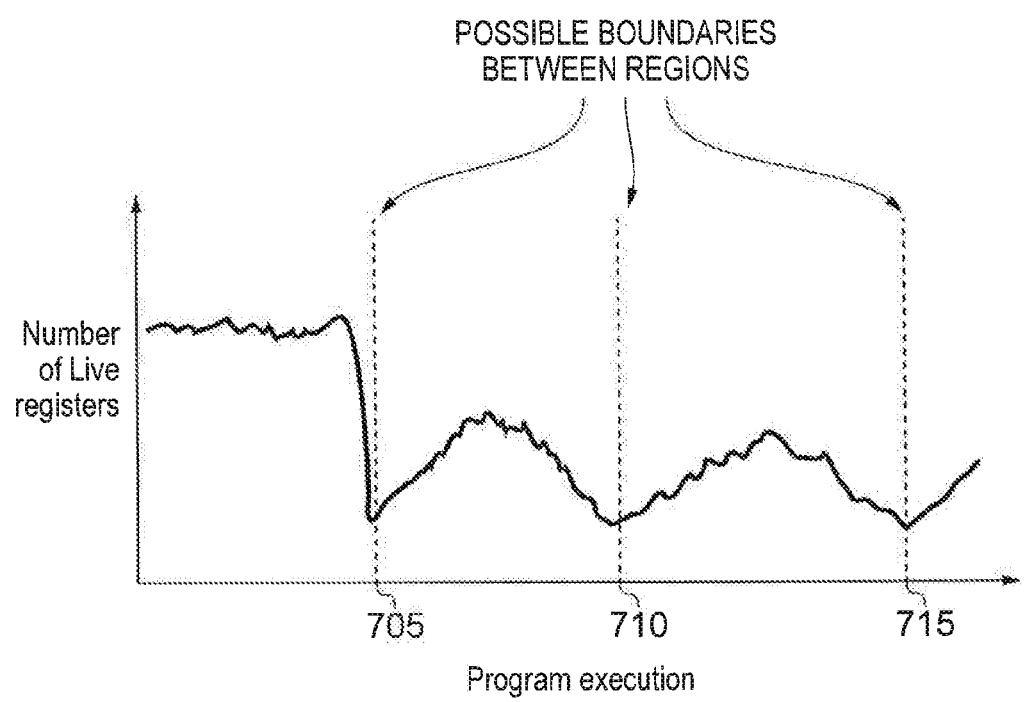
FIG. 7 is a graph illustrating how region boundaries can be determined in accordance with one example.

To reduce the amount of traffic between the operand staging unit and the memory system, it is desirable to partition the program code into regions at points where the number of active registers are relatively low, as schematically illustrated by FIG. 7. In this example, the number of live registers is indicated on the Y axis, and program execution progresses along the X axis. It will be appreciated that the points 705, 710, 715 identify possible boundaries between regions where the number of live registers is relatively low. Accordingly, both the number of output registers whose operand values may need preserving for a subsequent region, and the number of input registers whose operand values will need to be preloaded before a current region can begin execution are relatively small, and this can significantly reduce the traffic between the operand staging unit 40 and the level 1 data cache 45.

Figure 8:
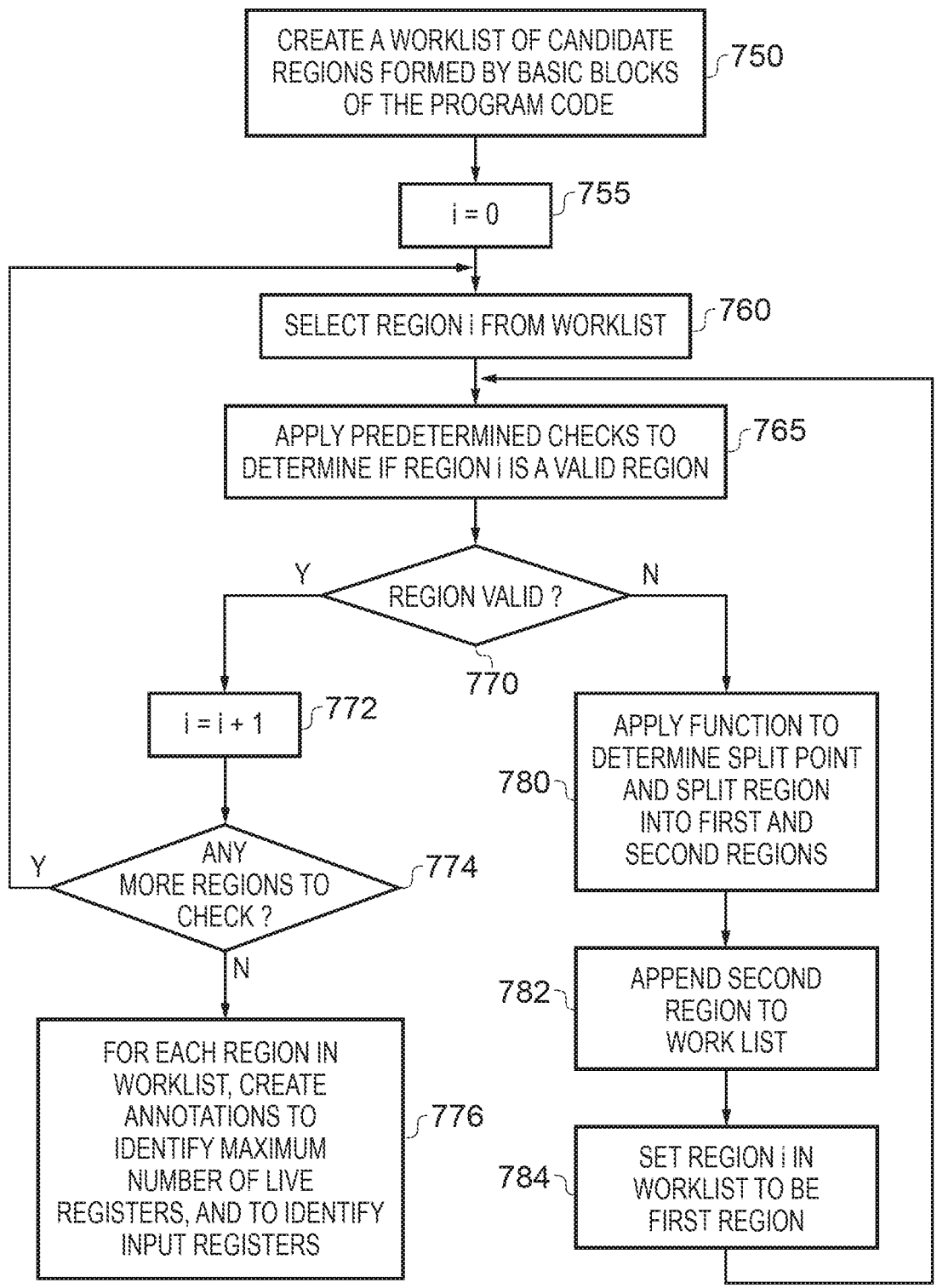
FIG. 8 is a flow diagram illustrating a region creation process that may be applied during compilation of program code in accordance with one example.

In one example arrangement, the decision as to where to partition the program code into regions is taken by compiler software executing on a computer. The process that may be performed by the compiler to identify suitable regions, and to provide compiler annotations for those regions, is set out in the flow diagram of FIG. 8.

At step 750, a work list is created containing a number of candidate regions. The candidate regions can be determined in a variety of ways, but in one example are set equal to basic blocks within the program code. As will be understood by those skilled in the art, a basic block is a region of code that, once it starts executing, will continue executing to the end of that basic block. Basic block boundaries may be determined by control flow, such as by if/then/else and loop constructs.

Following step 750, a parameter i is set equal to zero (step 755), and then at step 760 region i is selected from the work list. Thereafter, a number of predetermined checks are applied to determine if region i is a valid region. There are a number of tests that can be performed at this stage, and some examples will be discussed later with reference to an example algorithm. Based on the checks, it is then determined at step 770 whether the region is determined to be valid. If it is, then the value of i is incremented at step 772, and then at step 774 it is determined whether there are any more regions to be checked, i.e. whether there are any unchecked regions within the work list. If so, the process returns to step 760, but if not, then at step 776, for each region in the final version of the work list, annotations are created to identify the maximum number of live registers and to identify which registers are input registers. Additional annotations can also be added if desired, for example to identify the output registers, to identify the total number of registers accessed, to identify instructions where particular registers are used for the last time, etc.

If at step 770 it is determined that the region is not valid, then at step 780 a function may be applied to determine a split point in order to split the region into first and second regions. The second region is then appended to the work list at step 782, whilst the first region is then set at step 784 to be region i, whereafter the process returns to step 765.

The algorithm used to implement the process of creating the list of regions to be annotated can take a variety of forms but algorithm 1 below sets out one example algorithm:

Algorithm 1 - Region Creation

```
 1: function CreateRegions(cfg)
 2:     regions ← ∅
 3:     worklist ← basic blocks in cfg
 4:     while worklist is not empty do
 5:         region ← worklist.pop( )
 6:         if not IsValid(region) then
 7:             splitPc ← FindSplitPoint(region)
 8:             Split region at splitPc into firstRegion and secondRegion
 9:             region ← firstRegion
10:             worklist.append(secondRegion)
11:         end if
12:         regions.append(region)
13:     end while
14:     return regions
15: end function
16:
17: function IsValid(region)
18:     if region.maxLiveRegs > maximum registers per region then
19:         return false
20:     else if region.maxRegsPerBank > registers in each OSU bank then
21:         return false
22:     else if region contains a global load and its first use then
23:         return false
24:     end if
25:     return true
26: end function
27:
28: function FindSplitPoint(region)
29:     upperBound ← first PC where the first region becomes invalid
30:     lowerBound ← PC <= upperBound where the number of global
                     loads and uses in both new regions is minimized
31:     lowerBound ← min(max(region.startPC + 48, lowerBound),
                     upperBound)
32:     return PC such that lowerBound <=PC <= upperBound and splitting at PC
                     results in the fewest number of input and output registers in both new
                     regions combined
33: end function
```

Considering the 'CreateRegions' function it can be seen that this function starts by creating a control flow graph with regions equal to basic blocks. It then iterates through each region, determining whether it meets all constraints, and if not splits that region into two regions. The first new region from the split is guaranteed to be valid, but the second must be re-examined by the algorithm.

The "IsValid" function determines whether the region is valid by checking whether the region uses few enough registers to fit within the operand staging unit. In the particular example shown, a first test is whether the maximum number of live registers does not exceed a predetermined number of maximum registers to be allowed per region. In particular, it may be predetermined that it is undesirable for any particular region to occupy more than a certain percentage of the overall available space within the operand staging unit, and the first check performed by the IsValid function can then determine whether the maximum number of live registers would exceed that allowed maximum percentage. Accordingly, the maximum number of registers used in the region is used to limit the amount of the operand staging unit one region can fill, so that one region cannot take up too large a fraction of the operand staging unit and thereby limit concurrency. Since in the described example the operand staging unit is split into multiple banks, the registers used by a region must fit inside those banks, and this is checked by the code at line 20.

Finally, in one example a global load and its first use are not allowed to exist within the same region and this is tested at line 22 of the code. In particular, global loads typically have long latency, and if a warp were to stall on a long latency load in the middle of a region, it would consume space in the OSU whilst not being able to issue any instructions. Hence, in the example, long latency loads are ideally placed at the boundary between regions to overlap the time the register is waiting for the load with the time it is waiting for capacity in the OSU. To achieve this the compiler seeks to split regions containing a load and its first use.

If it is required to split a region, then the 'FindSplitPoint' function is used to identify a window in which the split should occur. The "upperBound" is the first program counter value where a newly created first region from the split would become invalid. This hence represents the latest possible split point. As indicated by line 30 of the code, the first instruction in the window (the "lowerBound") is the program counter location that would put the region boundary between the most global loads and their first uses. Line 31 of the code then adjusts the beginning of the window to contain at least six instructions if possible, to avoid degenerately small regions. Then, as shown at line 32 of the code, the region is split at the point in this window where the split would create the least amount of input and output registers.

As mentioned earlier, in addition to the region annotations used to identify the number of storage elements to be reserved, and to identify the input registers, the compiler can also annotate the code for particular regions to identify when instructions are using registers for the last time. In one example, both interior registers and input and output registers can be stored in the operand staging unit, but only the input and output registers need potentially to be evicted to the level 1 data cache. Accordingly, in one example arrangement the annotations added by the compiler code are different depending on whether the register being referred to is an interior register or an input/output register.

In particular, with regards to interior registers, since for those registers their entire lifetime exists within one region, it is sufficient to mark the last use of the registers within the region. In one example, an erase annotation can be used for this purpose, for example:

$r0=r1+r2$ erase:$r1$

Input and output registers also have a lifetime in the operand staging unit while a region is executing, in that there is some point in the region where they will be used for the last time in that region. These last uses are marked in one example by an evict annotation, for example:

$r0=r0+r2$ erase:$r2$,evict:$r0$

Hence, in this example it is assumed that register r0 is an output register, and accordingly is marked for eviction. However, it will be apparent from the earlier discussion that this does not mean that the register must be evicted from the operand staging unit, only that it becomes eligible for eviction at that point. At that point, it can be added into the dirty or clean list as appropriate.

Figure 9:
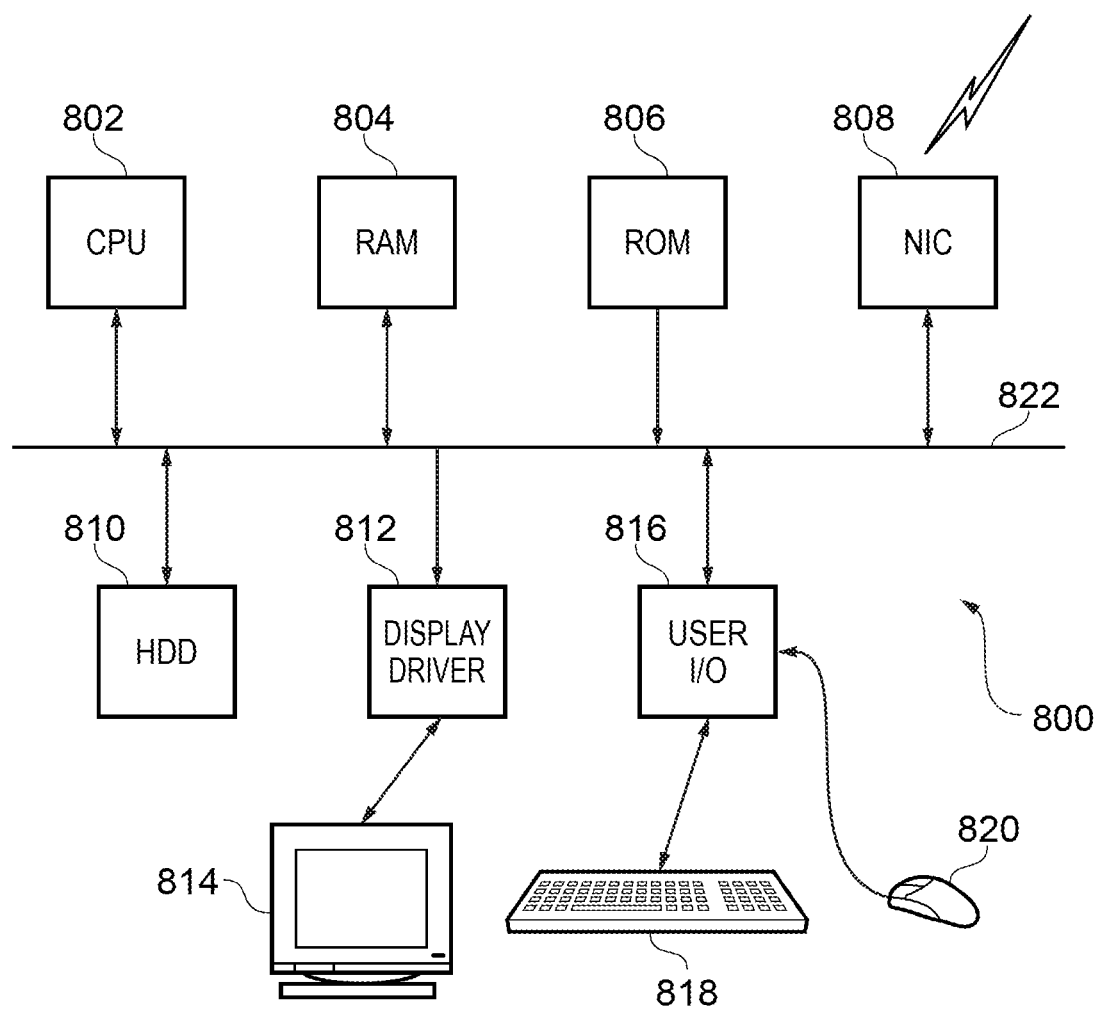
FIG. 9 schematically illustrates a general purpose computer that may be used to perform the region creation process described herein, in accordance with one example.

FIG. 9 schematically illustrates a general purpose computer 800 of the type that may be used to implement the above described region creation techniques. The general purpose computer 800 includes a central processing unit 802, a random access memory 804, a read only memory 806, a network interface card 808, a hard disk drive 810, a display driver 812 and monitor 814 and a user input/output circuit 816 with a keyboard 818 and mouse 820 all connected via a common bus 822. In operation the central processing unit 802 will execute computer program instructions that may be stored in one or more of the random access memory 804, the read only memory 806 and the hard disk drive 810 or dynamically downloaded via the network interface card 808. The results of the processing performed may be displayed to a user via the display driver 812 and the monitor 814. User inputs for controlling the operation of the general purpose computer 800 may be received via the user input output circuit 816 from the keyboard 818 or the mouse 820. It will be appreciated that the computer program could be written in a variety of different computer languages. The computer program may be stored and distributed on a recording medium or dynamically downloaded to the general purpose computer 800. When operating under control of an appropriate computer program, the general purpose computer 800 can perform the above described region creation techniques during compilation of the program code, and can be considered to form an apparatus for performing the above described technique. The architecture of the general purpose computer 800 could vary considerably and FIG. 9 is only one example.

Alternatively, the above-described techniques may be implemented in a more distributed fashion, wherein the general purpose computer 800 illustrated in FIG. 9 may be expanded and/or replaced by an infrastructure comprising components implemented on separate physical devices, the separate physical devices sharing the processing required to carry out these techniques. Such separate physical devices may be physically proximate to one another, or may even be located at entirely different physical locations. In some configurations such an infrastructure is termed a 'cloud computing' arrangement.

As will be apparent from the above described examples, these examples provide a mechanism that allows a significant reduction in storage requirements required to support the provision of the required registers in a multithreaded processing system. Instead of a full register file that contains every live value, the described mechanism maintains a small operand staging unit. Code running on the processor is divided into regions, and just in time for a region to begin execution the described mechanism allocates register space for it in the operand staging unit. Most operands lifetimes are contained in one region, so that when that region has finished executing the staging unit can reuse the relevant storage elements. An operand value with a lifetime that spans regions can be evicted into the memory hierarchy when no active region is using it, and hence before a region can begin executing, the described mechanism fetches any needed long-lived register operands from memory.

In one example, in order to allow the capacity manager to manage the operand staging unit effectively, visibility into future register usage is provided through the use of compiler annotations in the instruction stream. The capacity manager controls which warps are eligible to issue instructions, ensuring that warps allowed to execute always have sufficient storage capacity in the operand staging unit reserved for them. Other compiler annotations can be used to identify when a register operand dies, and accordingly can be erased from the operand staging unit. In one example, the compilation mechanism seeks to divide the code into regions at points that seek to maximise the number of interior registers within the region, thereby reducing the amount of traffic moved between the operant staging unit and the memory system.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative example of the invention have been described in detail herein with reference to the accompanying drawings, it is to be understood that the invention is not limited to those precise examples, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
scheduling circuitry to select thread groups from a plurality of thread groups, each thread group having associated program code and comprising one or more threads;
thread processing circuitry, responsive to the scheduling circuitry, to process one or more threads of a selected thread group by executing instructions of the associated program code for those one or more threads;
the associated program code for each thread group comprising a plurality of regions that each require access to an associated plurality of registers providing operand values for instructions of that region;
an operand staging unit comprising a plurality of storage elements that are dynamically allocated to provide the associated plurality of registers for one or more of the regions; and
capacity management circuitry arranged, for a thread group having a given region of the associated program code that is ready to be executed, to perform an operand setup process to reserve sufficient storage elements within the operand staging unit to provide the associated plurality of registers required to be accessed by the given region, and to cause an associated operand value for any input register within the associated plurality of registers to be preloaded into a reserved storage element allocated for that input register, where an input register is a register whose operand value is required before the given region can be executed,
the scheduling circuitry being arranged to be able to select the thread group comprising the given region of the associated program code once the capacity management circuitry has performed the operand setup process in respect of the given region, and
once the thread group comprising the given region has been selected, the thread processing circuitry being arranged to execute the instructions of the given region with reference to the registers as provided by the operand staging unit.

2. An apparatus as claimed in claim 1, wherein said associated plurality of registers for the given region comprises one or more of input registers, interior registers and output registers, where an interior register is a register whose operand value has a lifetime entirely within the given region, and an output register is a register whose operand value is to be used as an input to a subsequent region of the associated program code.

3. An apparatus as claimed in claim 1, wherein each region is an atomic region, such that once the scheduling circuitry has selected a thread group, the thread processing circuitry will complete execution of a current region of that selected thread group before that selected thread group is deselected.

4. An apparatus as claimed in claim 1, wherein the thread processing circuitry is arranged to execute concurrently regions for multiple selected thread groups.

5. An apparatus as claimed in claim 2, wherein the one or more of the regions of the associated program code is chosen so that a majority of the associated plurality of registers are interior registers.

6. An apparatus as claimed in claim 1, wherein the capacity management circuitry has access to region information providing, for the thread group having the given region of the associated program code that is ready to be executed, an indication of the number of storage elements that need to be reserved in order to provide the associated plurality of registers required to be accessed by the given region, and identifying input registers within the associated plurality of registers.

7. An apparatus as claimed in claim 6, wherein the plurality of regions are determined at a time the associated program code is compiled, and the region information is provided by compiler annotations accessible to the capacity management circuitry.

8. An apparatus as claimed in claim 1, wherein said associated plurality of registers are a subset of a set of registers that are able to be specified by instructions of the associated program code.

9. An apparatus as claimed in claim 1, wherein the capacity management circuitry is arranged to maintain an indication of available capacity within the operand staging unit and, for the thread group having the given region of the associated program code that is ready to be executed, is arranged to perform the operand setup process when the available capacity is sufficient to allow reservation of sufficient storage elements within the operand staging unit to provide the associated plurality of registers required to be accessed by the given region.

10. An apparatus as claimed in claim 9, wherein at least by a time the thread processing circuitry has completed execution of a current region of a selected thread group, the storage elements used to provide the associated plurality of registers for that current region are added to the indication of available capacity.

11. An apparatus as claimed in claim 1, wherein said associated program code is annotated to provide register lifetime indications identifying when a register is accessed for a last time within the given region, the thread processing circuitry having access to the register lifetime indications and being arranged to cause a storage element within the operand staging unit to be marked as available once the register allocated to that storage element has been accessed for the last time within the given region.

12. An apparatus as claimed in claim 11, wherein:
said associated plurality of registers for the given region comprise one or more of input registers, interior registers and output registers, where an interior register is a register whose operand value has a lifetime entirely within the given region, and an output register is a register whose operand value is to be used as an input to a subsequent region of the associated program code; and
when the register that is accessed for the last time is an interior register, the thread processing circuitry is arranged to cause the corresponding storage element within the operand staging unit to be marked as free for a subsequent allocation.

13. An apparatus as claimed in claim 12, wherein when the register that is accessed for the last time is other than an interior register, the thread processing circuitry is arranged to cause the corresponding storage element within the operand staging unit to be marked for eviction to a memory system coupled to the operand staging unit.

14. An apparatus as claimed in claim 12, wherein the annotations within the associated program code that provide the register lifetime indications distinguish between interior registers and registers other than interior registers.

15. An apparatus as claimed in claim 1, wherein for each input register a storage element from amongst the reserved storage elements is allocated to that input register when the associated operand value is preloaded, whilst storage elements from amongst the reserved storage elements are allocated to each other register as that other register is written to for the first time during execution of the given region.

16. An apparatus as claimed in claim 1, wherein when preloading the associated operand value for each input register into a reserved storage element allocated for that input register, the operand staging unit is arranged to perform a lookup operation to determine whether that operand value is already stored within one of the storage elements, and to otherwise retrieve the operand value from a memory system coupled to the operand staging unit.

17. An apparatus as claimed in claim 1, wherein the operand staging unit comprises a plurality of banks of storage elements, the plurality of banks being accessible in parallel.

18. An apparatus as claimed in claim 1, wherein the capacity management circuitry is arranged, when performing the operand setup process, to reserve sufficient storage elements within the operand staging unit by reserving a number of storage elements sufficient to maintain operand values for a maximum number of registers within the associated plurality of registers that will hold live operand values at any point during execution of the given region.

19. A method of processing thread groups within an apparatus having scheduling circuitry to select thread groups from a plurality of thread groups, each thread group having associated program code and comprising one or more threads, and thread processing circuitry, responsive to the scheduling circuitry, to process one or more threads of a selected thread group by executing instructions of the associated program code for those one or more threads, the method comprising:
identifying within the associated program code for each thread group a plurality of regions that each require access to an associated plurality of registers providing operand values for instructions of that region;
providing an operand staging unit comprising a plurality of storage elements that are dynamically allocated to provide the associated plurality of registers for one or more of the regions; and
performing, for a thread group having a given region of the associated program code that is ready to be executed, an operand setup process to reserve sufficient storage elements within the operand staging unit to provide the associated plurality of registers required to be accessed by the given region, and to cause an associated operand value for any input register within the associated plurality of registers to be preloaded into a reserved storage element allocated for that input register, where an input register is a register whose operand value is required before the given region can be executed;
causing the scheduling circuitry to be able to select the thread group comprising the given region of the associated program code once the operand setup process has been performed in respect of the given region; and
once the thread group comprising the given region has been selected, causing the thread processing circuitry to execute the instructions of the given region with reference to the registers as provided by the operand staging unit.

20. A non-transitory computer program product comprising a compiler program used to compile program code for execution on an apparatus as claimed in claim 1, said compiler program when executed on a computer to compile said program code, being arranged to divide said program code into a plurality of regions for each of a plurality of thread groups to be executed, and to annotate the program code so as to provide, for each region that requires access to an associated plurality of registers, region information providing an indication of the number of storage elements that need to be reserved in order to provide the associated plurality of registers, and identifying the registers that are input registers.

21. A non-transitory computer program product as claimed in claim 20, wherein the compiler program is arranged to determine the plurality of regions into which the program code is to be divided by:
determining a set of candidate regions, and determining for each candidate region whether a set of constraints are met;
in the absence of said set of constraints being met for any candidate region, further splitting that candidate region to form multiple additional candidate regions and determining for each additional candidate region whether said set of constraints are met; and when all of the candidate regions meet the set of constraints, selecting those candidate regions as the plurality of regions into which the program code is to be divided.

\* \* \* \* \*